US007748040B2

(12) United States Patent
Adelstein et al.

(10) Patent No.: US 7,748,040 B2
(45) Date of Patent: Jun. 29, 2010

(54) ATTACK CORRELATION USING MARKED INFORMATION

(75) Inventors: Frank N. Adelstein, Ithaca, NY (US); Haim Bar, Ithaca, NY (US); Prasanth Alla, McLean, VA (US); Nikita Proskourine, Plainville, MA (US)

(73) Assignee: Architecture Technology Corporation, Minneapolis, MN (US)

( * ) Notice: Subject to any disclaimer, the term of this patent is extended or adjusted under 35 U.S.C. 154(b) by 1120 days.

(21) Appl. No.: 11/087,388

(22) Filed: Mar. 22, 2005

(65) Prior Publication Data
US 2006/0018466 A1 Jan. 26, 2006

Related U.S. Application Data

(60) Provisional application No. 60/587,219, filed on Jul. 12, 2004.

(51) Int. Cl.
*G06F 12/14* (2006.01)
(52) U.S. Cl. ....................................... 726/25
(58) Field of Classification Search ................. 726/11, 726/12, 22, 23, 25, 24; 713/153, 154, 162, 713/188
See application file for complete search history.

(56) References Cited

U.S. PATENT DOCUMENTS 6,345,283 B1   2/2002  Anderson
6,363,489 B1*  3/2002  Comay et al. ................. 726/22
6,981,155 B1* 12/2005  Lyle et al. ..................... 726/22
2002/0078382 A1  6/2002  Sheikh et al.
2002/0129264 A1  9/2002  Rowland et al.
2002/0162017 A1 10/2002  Sorkin et al.
2002/0163934 A1 11/2002  Moore et al.
2004/0010718 A1* 1/2004  Porras et al. ................ 713/201
2004/0128543 A1* 7/2004  Blake et al. ................. 713/201
2006/0053490 A1* 3/2006  Herz et al. .................... 726/23

FOREIGN PATENT DOCUMENTS

WO      WO 02071192 A2    9/2002

OTHER PUBLICATIONS

Laurent Oudot, "Fighting Internet Worms with Honeypots", Security Focus, Oct. 23, 2003.

* cited by examiner

*Primary Examiner*—Ellen Tran
(74) *Attorney, Agent, or Firm*—Shumaker & Sieffert, P.A.

(57) ABSTRACT

Techniques are described for providing security to a protected network. Techniques are described for thwarting attempted network attacks using marked information. The attack correlation system provides marked information to computing devices that probe for sensitive information, and monitors subsequent communications for use of the marked information. In one example, the attack correlation system reroutes communications containing the marked information to a dedicated vulnerable device that logs the communications to monitor the attackers' methods. The attack correlation system may also include functionality to exchange information regarding attempted attacks with other attack correlation systems to gain broader knowledge of attacks throughout one or more networks.

50 Claims, 15 Drawing Sheets

| MARKED INFO MODULE ID | PROBING IP ADDRESS | TIMESTAMP | MARKED INFO | SUBSEQUENT ATTACK IP ADDRESS |
|---|---|---|---|---|
| 3 | 318.14.15.13 | 20040724142668 | PASSWORD1 | 318.14.15.13 |
| 3 | 318.128.1.30 | 20040724140549 | PASSWORD2 | 264.33.48.115 |
| 3 | 321.14.50.3 | 20040724141612 | PASSWORD3 | 286.33.2.1 |
| 3 | 319.4.5.13 | 20040724143126 | PASSWORD4 | 316.14.5.23 |
| 3 | 318.14.22.56 | 20040824442721 | PASSWORDN | 318.14.15.13 |

*MFP: Running Processes - Mozilla*

ATC-NY Mobile Forensic Platform

| Initial Acquire | Acquire State | Acquire Files | Data Analysis | Data Display |

Running Processes

Click on a column heading to sort by that column. The current sort column is indicated in bold and by ascending/descending bars; to reverse the direction of the sort, click that column's heading.

More detailed information about a particular process is available by clicking on that process's name in the first column. Times are given in hhh:mm:ss.msec format, and start times are corrected to the MFP's clock.

Processes running during initial acquire:

Number of processes: 45

| Process Name | ID | Priority | # of Threads | # File Handles | Memory Use (KB) | User Time | Kernel Time | Elapsed Time | Start Time |
|---|---|---|---|---|---|---|---|---|---|
| System Idle Process | 0 | 0 | 1 | 0 | 16 | 0:0:0.0 | 307:13:8.94 | - | - |
| System | 8 | 8 | 44 | 220 | 217 | 0:0:0.0 | 0:1:42.953 | - | - |
| EXPLORER.EXE | 148 | 8 | 16 | 633 | 6263 | 0:0:30.297 | 0:0:47.313 | 310:53:14.31 | Thu May 08 16:44:26 EDT 2003 |
| SMSS.EXE | 176 | 11 | 6 | 33 | 647 | 0:0:0.16 | 0:0:0.703 | 310:54:13.219 | Thu May 08 16:43:27 EDT 2003 |
| WINLOGON.EXE | 196 | 13 | 17 | 372 | 3396 | 0:0:0.672 | 0:0:2.422 | 310:53:52.156 | Thu May 08 16:43:48 EDT 2003 |
| CSRSS.EXE | 200 | 13 | 10 | 477 | 1389 | 0:0:0.906 | 0:1:10.406 | 310:53:54.78 | Thu May 08 16:43:46 EDT 2003 |
| SERVICES.EXE | 248 | 9 | 37 | 637 | 13709 | 0:0:3.250 | 0:0:9.609 | 310:53:51.313 | Thu May 08 16:43:49 EDT 2003 |
| LSASS.EXE | 260 | 9 | 19 | 325 | 2339 | 0:0:0.734 | 0:0:1.609 | 310:53:51.297 | Thu May 08 16:43:49 EDT 2003 |
| rxvt.exe | 336 | 8 | 4 | 91 | 1262 | 0:0:0.828 | 0:0:2.297 | 292:28:36.266 | Fri May 09 11:09:04 EDT 2003 |
| SVCHOST.EXE | 440 | 8 | 11 | 372 | 4932 | 0:0:0.172 | 0:0:0.281 | 310:53:48.391 | Thu May 08 16:43:52 EDT 2003 |
| SPOOLSV.EXE | 472 | 8 | 13 | 221 | 7999 | 0:0:1.47 | 0:0:1.313 | 310:53:48.219 | Thu May 08 16:43:52 EDT 2003 |
| SVCHOST.EXE | 540 | 8 | 22 | 308 | 8086 | 0:0:0.172 | 0:0:0.766 | 310:53:41.672 | Thu May 08 16:43:59 EDT 2003 |
| mdm.exe | 564 | 8 | 4 | 108 | 3670 | 0:0:0.250 | 0:0:0.313 | 310:53:41.266 | Thu May 08 16:43:59 EDT 2003 |
| AcroTray.exe | 600 | 8 | 1 | 32 | 1618 | 0:0:0.16 | 0:0:0.78 | 310:53:10.31 | Thu May 08 16:44:30 EDT 2003 |
| mozilla.exe | 616 | 8 | 15 | 299 | 37724 | 0:4:28.938 | 0:1:58.938 | 310:52:57.969 | Thu May 08 16:44:43 EDT 2003 |
| REGSVC.EXE | 644 | 8 | 2 | 31 | 1249 | 0:0:0.31 | 0:0:0.63 | 310:53:40.31 | Thu May 08 16:44:00 EDT 2003 |
| MSTASK.EXE | 664 | 8 | 6 | 117 | 3703 | 0:0:0.31 | 0:0:0.63 | 310:53:39.719 | Thu May 08 16:44:01 EDT 2003 |

FIG. 14B

ATTACK CORRELATION USING MARKED INFORMATION

This application claims the benefit of U.S. Provisional Application No. 60/587,219, filed on Jul. 12, 2004, the entire contents being incorporated herein by reference.

STATEMENT REGARDING FEDERALLY SPONSORED RESEARCH OR DEVELOPMENT

This invention was developed with governmental support under contract number DAAH01-03-C-R118. The government has certain rights in this invention.

TECHNICAL FIELD

The invention relates to correlation of attacks within a computer network.

BACKGROUND

Preventing unauthorized users from gaining access to private information, such as credit card numbers, maintained by a networked computer system is of the utmost importance. Unsophisticated attackers with limited resources can be detected and defeated with conventional best-practice security measures, such as use of firewalls and virus detectors, installing and maintaining current software updates, and auditing log data. Sophisticated attackers, however, often use techniques that bypass conventional detection mechanisms and penetrate or bypass firewalls. Worse, coordinated attacks may be launched from multiple machines, e.g., by using one machine for reconnaissance and another for the attack, and may target multiple machines, sometimes within the same department or organization.

Conventional attack correlation systems take a passive approach at stopping unauthorized users or "hackers." These conventional attack correlation systems log all available information and analyze the logged information to identify attacks. In particular, a network attack correlation system logs information contained in packets addressed to a protected network, such as source addresses, destination addresses, protocol identification (TCP, ICMP, etc.), and other fields like time-to-live (TTL). Generally, an organization the size of a mid-sized university or company may easily accumulate hundreds of gigabytes of data from its routers and firewalls over a few weeks or months. Consequently, conventional approaches may be impractical and ineffective for many organizations.

SUMMARY

In general, techniques are described for providing security to a protected network. As one example, the invention provides techniques for thwarting attempted network attacks using marked information. The term "marked information," as referred to herein, means specially crafted detectable information (e.g., false information) that is traceable by an attack correlation system. The attack correlation system provides marked information to computing devices that probe for sensitive information, and monitors communications within a protected network for marked information.

For example, upon receiving a probe from an attack device, the attack correlation system dynamically generates marked information and sends a response to the probe that includes the marked information. The attack correlation system may provide unique marked information to probes sent by different attack devices. As a result, a first probing attack device will be provided with different marked information than a subsequent probing attack device. The attack correlation system stores an identification, such as an Internet Protocol (IP) address, of the probing attack device and the marked information provided to the probing attack device. As will be described, providing unique marked information to each probing device allows the attack correlation system to correlate the stages of an attempted attack.

The attack correlation system monitors for receipt of communications containing any of the marked information disseminated to the attack devices. The marked information enables the attack correlation system to identify traffic from the probing attack device, or a different attack device, as an attempted attack. Upon identifying marked information within a communication, the attack correlation system correlates patterns of the attacker using the marked information. The attack correlation system may, for example, correlate the attackers' reconnaissance activities, e.g., the probing activities, with the subsequent attacks.

The attack correlation system may respond to the attack. In one embodiment, the attack correlation system reroutes communications containing marked information to a vulnerable device. As described below in detail, the vulnerable device may be a dedicated computing device coupled to the attack correlation system or a virtual vulnerable device executing within the attack correlation system. The vulnerable device may log communications with the attack device to monitor the attackers' activities. In this manner, a system administrator may identify vulnerabilities in the network being protected, learn new attack techniques, and the like.

The attack correlation system may also include functionality to exchange information regarding attempted attacks with other attack correlation systems. For example, multiple attack correlation systems may query one another, either directly or indirectly via a central node, regarding attempted network attacks monitored by one another. In this manner, the attack correlation systems may gain broader knowledge of attempted attacks and attacking methods.

In addition, the attack correlation system may include a host analysis device that acquires host analysis information associated with a compromised vulnerable device. From analysis of the data acquired from the compromised vulnerable device, a system administrator or software agent may be able to better determine attack methods used by the attack devices. The system administrator may compare, for example, the types of processes and services running on the vulnerable device before and after being compromised and thus better identify the attackers methods and effects. The host information collected by host analysis module may also be exchanged with other attack correlation systems along with the marked information.

In one embodiment, the invention provides a method comprising receiving a communication addressed to a device within a protected network, analyzing the communication for marked information that identifies a source of the communication as a potential attack device, and rerouting the communication to a vulnerable device when marked information is detected within the communication.

In another embodiment, the invention provides a system comprising a vulnerable device that runs one or more services that correspond to services offered by devices within a protected network and at least one marked information module that analyzes communications addressed to a device within the protected network for marked information and reroutes communications that include marked information to the vulnerable device.

In a further embodiment, the invention provides a method comprising generating a marked information database. The marked information database stores data that associates potential attack devices with marked information. The method further comprises exchanging at least a portion of the data with an attack correlation system.

In yet another embodiment, the invention provides a system comprising a marked information module that receives a probe communication from a potential attack device, sends marked information to the potential attack device in response to the probe communication and stores the marked information and information that identifies the potential attack device in a marked information database. The marked information module further monitors incoming communications and identifies communications that include the marked information. The system further includes a controller that receives a communication that includes marked information from the marked information module and stores information that identifies a source computing device of the communication as a potential attack device associated with the marked information in the marked information database. The controller exchanges at least a portion of the information stored in the marked information database with other attack correlation systems.

In a further embodiment, the invention provides a computer-readable medium comprising instructions that cause a processor to receive a communication addressed to a device within a protected network, analyze the communication for marked information that identifies a source of the communication as a potential attack device, and reroute the communication to a device that runs one or more services that emulate services offered by the device within the protected network when marked information is detected within the communication.

In another embodiment, the invention provides a system comprising a first attack correlation system that monitors attempted attacks using marked information and a second attack correlation system that monitors attempted attacks using marked information, wherein the first and second attack correlation systems exchange information associated with attempted attacks with one another.

In another embodiment, the invention provides a attack correlation system comprising a virtual vulnerable device that runs one or more services that emulate services offered by at least one device within a protected network on top of a virtual infrastructure and at least one marked information module that analyzes communications addressed to devices within the protected network for marked information and reroutes communications that include marked information to the vulnerable device.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 is a block diagram illustrating an exemplary marked information data structure maintained by the attack correlation system.

FIG. 13 is a screen illustration of an exemplary user interface for viewing host information acquired from the vulnerable device.

FIGS. 14A and 14B are screen illustrations of an upper and lower portion of an exemplary user interface presented to a user.

DETAILED DESCRIPTION

Figure 1:
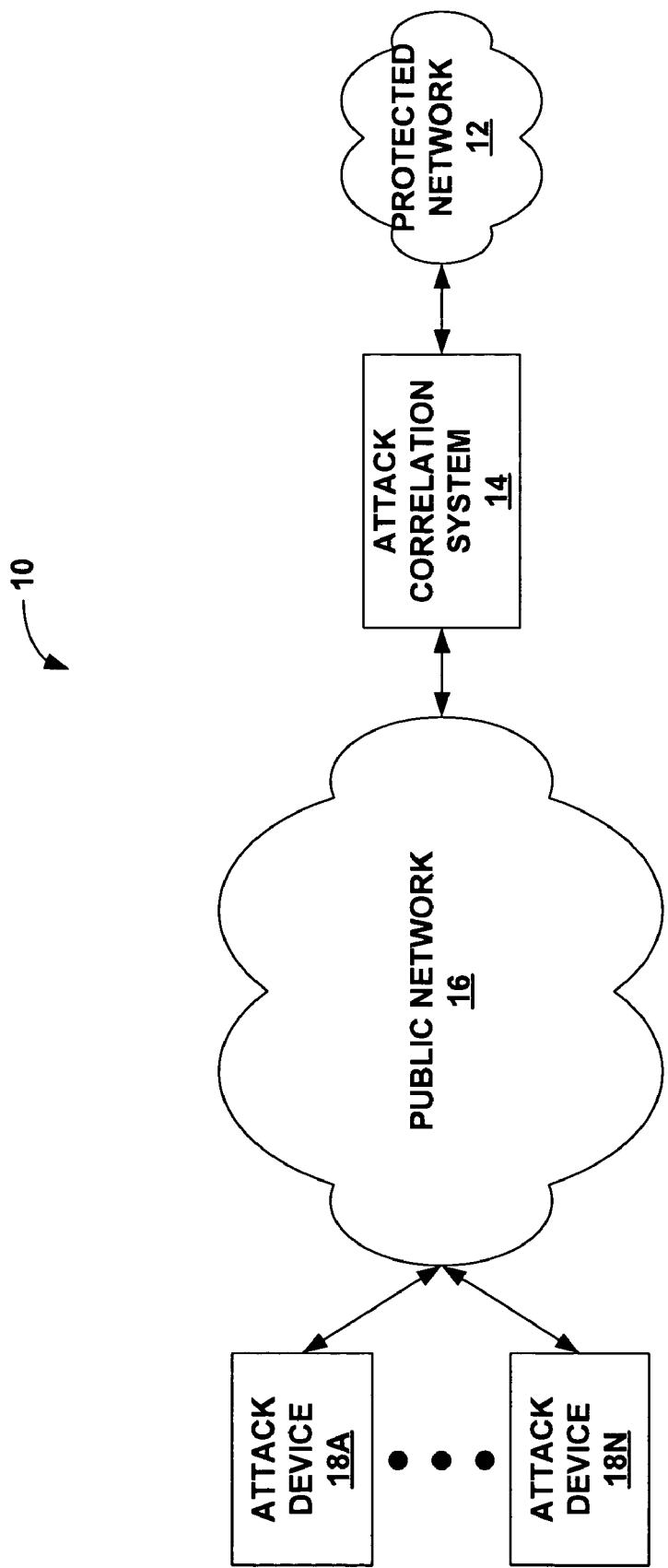
FIG. 1 is a block diagram illustrating an exemplary embodiment of a system for providing security to a protected network in accordance with the techniques described herein.

FIG. 1 is a block diagram illustrating an exemplary system 10 for providing security to a protected network 12 in accordance with the techniques described herein. As will be described, an attack correlation system 14 thwarts attempted attacks on protected network 12 using "marked information." The term "marked information," as referred to herein, means specially crafted detectable information that is traceable by attack correlation system 14.

Protected network 12 couples to a public network 16, such as the Internet. In one embodiment, protected network 12 couples to public network 16 through attack correlation system 14. Attack correlation system 14 monitors inbound network communications destined to protected network 12. Attack correlation system 14 provides marked information to computing devices, such as attack devices 18A-18N ("attack devices 18"), that probe for sensitive information, and monitors for communications within protected network 12 that utilize the marked information.

Protected network 12 may, for example, be a local area network for a specific site of an enterprise, or may span geographically distributed sites within the enterprise. In other words, protected network 12 may include one or more Local Area Networks (LANs), Wide Area Network (WANs), Wireless LANs or the like. Additionally, protected network 12 may include digital subscriber lines (DSLs), cable modems or other broadband connections. Protected network 12 may include one or more connected network devices (not shown), such as personal computers, laptop computers, handheld computers, workstations, servers, routers, switches, printers, fax machines, or the like.

In some embodiments, attack correlation system 14 may operate in place of or in addition to a conventional firewall.

The location of attack correlation system 14 depends on its application. Often portions of attack correlation system 14 will be located in different areas of protected network 12. For example, a set of one or more marked information modules that distribute marked information to probing devices and monitor for the marked information may be located within a "demilitarized zone" (DMZ) provided by a firewall, while a controller and marked information database may be located behind the firewall for increased security. Portions of attack correlation system 14 may be located in numerous other areas including coupled to the firewall, a gateway server, an Internet Service Provider (ISP) server, a web server, before or after a gateway server, and other locations depending upon the desired application.

Attack devices 18 may comprise, for example, unauthorized users using computing devices in an attempt to gain access to protected network 12. Alternatively, a portion of attack devices 18 may comprise network devices that have been "taken over" by an attacker and utilized as dummy devices. Although in FIG. 1 attack devices 18 are located outside protected network 12, one or more of the attack devices may be located within protected network 12. In this manner, the techniques of the invention may be used to identify and thwart attacks initiated by attack devices within protected network 12 as well as by attack devices external to protected network 12.

In one embodiment, attack correlation system 14 includes a vulnerable device (not shown in FIG. 1). As will be described in detail below, the vulnerable device acts as a decoy machine that lures in potential attackers, thereby allowing a system administrator to study their activities and the methods used by the attacker. Generally, the vulnerable device mimics systems into which an attacker would likely break, e.g., other devices within protected network 12. In this manner, the vulnerable device interacts with the attacker as if it were a node in protected network 12. The vulnerable device, however, limits the attacker from having access to the entire protected network 12.

Typically, a sophisticated attacker probes a potential target device of protected system 12 using one of attack devices 18. The attackers may, for example, probe devices within protected network 12 in order to collect information concerning the vulnerabilities and weaknesses of protected network 12. Based on this collected information, the attacker may try to exploit the weak and vulnerable areas of protected network 12. Upon receiving a probe from one of attack devices 18 (e.g., attack device 18A for exemplary purposes), attack correlation system 14 dynamically generates a set of marked information and utilizes the marked information when responding to the probe. In this manner, attack correlation system 14 emulates a real node on protected network 12 by emulating responses to the probes from attack devices 18. By dynamically generating the marked information, attack device 18A will be provided with different marked information than other attack devices, such as attack device 18B. As will be described, providing unique marked information to each probing device allows attack correlation system to correlate each stages of an attempted attack, and associate the attack with a particular attack device.

Attack correlation system 14 stores information from the received probe and the marked information provided to the probing attack device. For example, attack correlation system 14 may store a source address (e.g., an Internet Protocol (IP) address) of attack device 18A, i.e., the probing attack device, a destination address, a source port number, a destination port, the protocol used to communicate the probe (e.g., TCP/IP), the type of data probed, and/or other information.

Attack correlation system 14 monitors for communications containing any of the marked information disseminated to attack devices 18. The marked information enables traffic from the probing attack device (i.e., attack device 18A in this example) to be identified if an intrusion attempt is made from attack device 18A. Additionally, the marked information enables attack traffic from a different one of attack devices 18 to be identified as an attempted attack and correlated with the associated probing attack device. For example, if an attacker probed protected network 12 using a first attack device 18A and then attempted to launch an attack using a second attack device 18B, attack correlation system 14 would be able to detect and correlate the attempted attack with the initial probe using the marked information.

More specifically, upon identifying marked information contained in a communication, attack correlation system 14 correlates the attackers' reconnaissance activities, e.g., the probing, with the subsequent attacks using the stored marked information. Additionally, attack correlation system 14 may respond to the attack. Attack correlation system 14 may, for example, reroute the communications from attack devices 18 to the vulnerable device. As described below in detail, the vulnerable device may be a dedicated computing device coupled to attack correlation system 14 or a virtual vulnerable device executing within attack correlation system 14. The vulnerable device may log communication with the attack device, thereby allowing a system administrator or other human or software agent to monitor the attackers methods. In this manner, a system administrator may identify vulnerabilities in the system, learn new attack techniques, generate a signature for the attack, and the like. As another example, attack correlation system 14 may dynamically reconfigure a firewall associated with protected network 12 to block communications from any attack device 18 identified as sending communication that include marked information. As other examples, attack correlation system 14 may send an alert message to a network administrator, or send an alert message to other attack correlation systems.

In general, from an external perspective, attack correlation system 14 attempts to mimic behavior of a normal system device within protected network 12. Additionally, attack correlation system 14 dynamically generates the marked information in a form that as much as possible appears to be legitimate system data consistent with data maintained by other nodes within protected network 12. Attack correlation system 14, therefore, has a low risk of detection by attackers.

Figure 2:
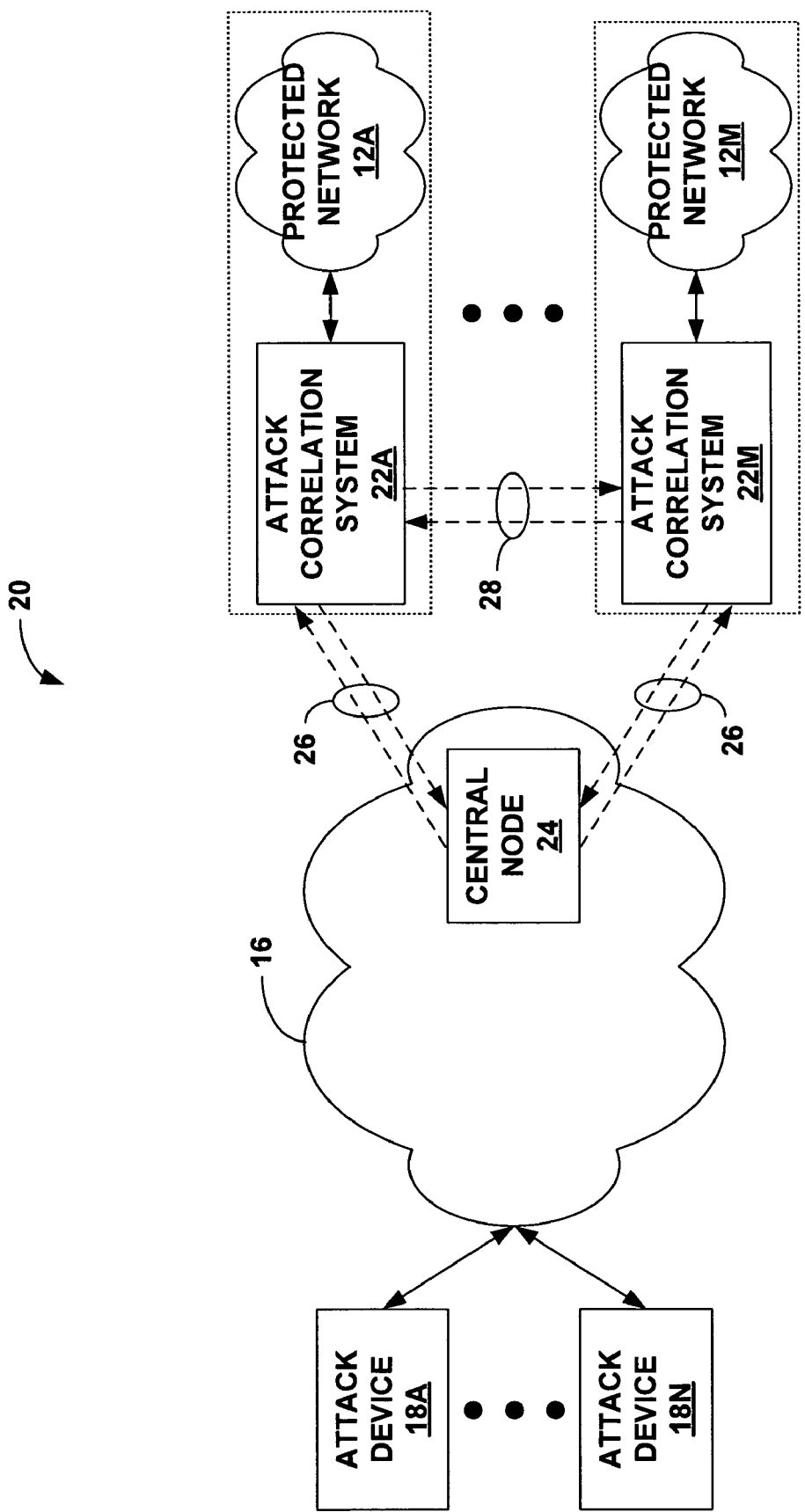
FIG. 2 is a block diagram illustrating another exemplary system for thwarting attempted network attacks.

FIG. 2 is a block diagram illustrating another system 20 for thwarting attempted network attacks. In general, system 20 conforms substantially to system 10 of FIG. 1, but system 20 includes multiple attack correlation systems providing security for multiple protected networks. In particular, attack correlation systems 22A-22M ("attack correlation systems 22") thwart network attacks against protected networks 12A-12M ("protected networks 12") in the same manner as described above with reference to FIG. 1. None, a portion, or all of attack correlation systems 22 may include a vulnerable device for luring attackers.

Attack correlation systems 22 further include functionality that allows attack correlation systems 22 to exchange information regarding attempted attacks with one another. In particular, attack correlation systems 22 may query one another, either directly, as indicated by dashed lines 28, or indirectly via a central node 24, as indicated by dashed lines 26, regarding attempted network attacks monitored by one another. As one example, attack correlation system 22A may issue a query to central node 24 requesting information regarding attempted attacks gathered by other attack correlation systems 22, such as whether any of the other attack correlation systems have received probes from a particular IP address. Central node 24 may in turn query all or a portion of attack correlation systems 22 to obtain the answer to the query. After collecting the information from the other attack correlation systems, central node 24 sends the answer to the querying system, i.e., attack correlation system 22A in this example. Attack correlation system 22A may initiate the query in response to a command from a system administrator or automatically, such as by periodically sending such a query. In some embodiments, attack correlation systems 22 may query one another directly and thus bypass central node 24.

Additionally, or alternatively, central node 24 may periodically query each of attack correlation systems 22 to gather information regarding attempted attacks. Central node 24 may analyze the gathered information and generate a summary of attack information that may be of concern to any of attack correlation systems 22. Central node 24 may, for example, send a summary report that includes the IP addresses of all the source devices that attempted to attack one of protected systems 12, e.g., attack devices 18. Central node 24 may generate and send this report hourly, daily, weekly, upon request by a system administrator or software agent, or the like. In this manner, attack correlation systems 22 exchange information regarding attempted attacks in order to gain a broader awareness of potential attackers 18. Although the summary functionality described above is performed within central node 24, the summary functionality may be performed by one of attack correlation systems 22, or may be distributed within two or more devices operating as central node 24.

Figure 3:
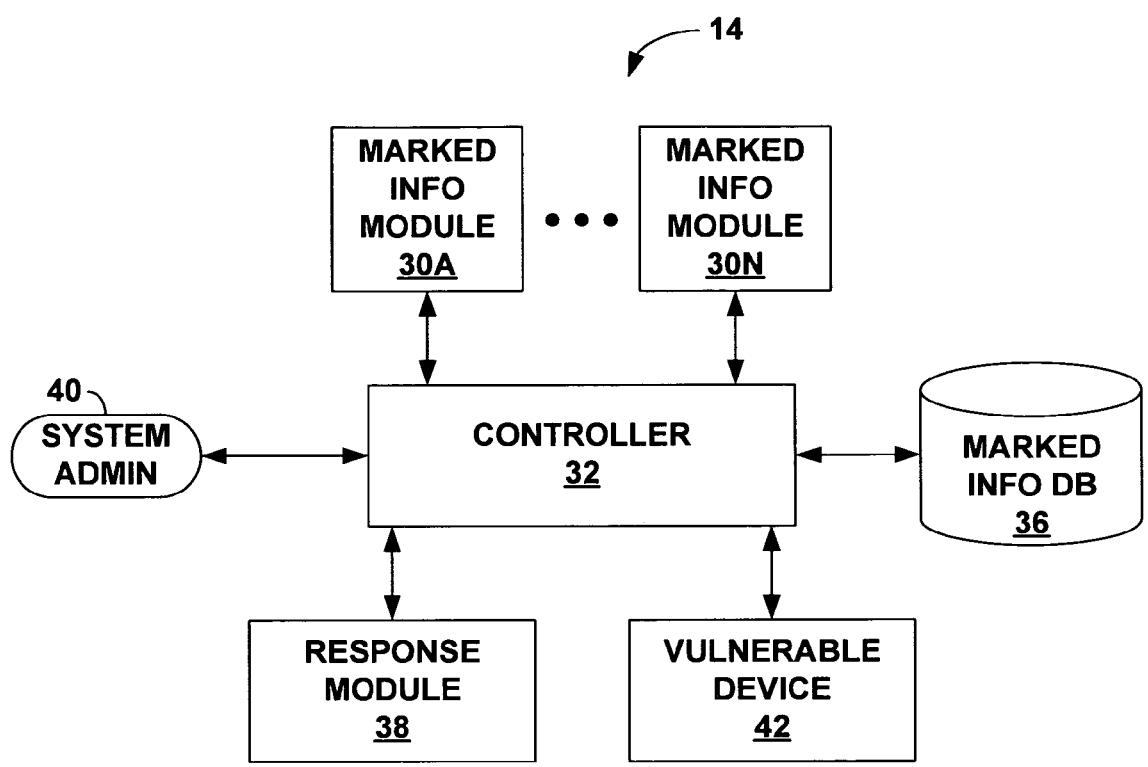
FIG. 3 is a block diagram of an exemplary embodiment of an attack correlation system.

FIG. 3 is a block diagram illustrating an example embodiment of an attack correlation system, such as attack correlation system 14 of FIG. 1, in further detail. In the example embodiment, attack correlation system 14 includes marked information modules 30A-30N ("marked information modules 30"), a controller 32, a marked information database 36 and a response module 38. Although FIG. 1 is described in terms of multiple marked information modules 30, attack correlation system 14 may include only a single marked information module. Similarly, attack correlation system 14 may include multiple marked information databases 36 and/or response modules 38.

In general, intrusion detection module 14 thwarts attempted attacks on a protected system 12 coupled to a public network 16 using marked information. In particular, marked information modules 30 generate and provide attackers with marked information, which is then used to recognize and correlate coordinated phases of an attack.

Marked information modules 30 provide each attack device 18 that probes protected network 12 with unique marked information. For example, marked information modules 30 dynamically generate marked information to provide each of attack devices 18 that probe for sensitive information with unique marked information. Similarly, marked information modules 30 may dynamically generate unique marked information for different probes received from the same attack device.

Marked information modules 30 record information from the received probe and the marked information provided to the probing attack device in marked information database 36. For example, marked information modules 30 may store a source address (e.g., an Internet Protocol (IP) address) of attack device 18A (i.e., the probing attack device) a destination address, a source port number, a destination port, the protocol used to communicate the probe (e.g., TCP/IP), the type of data probed, and/or other information. Marked information modules 30 may also store additional information in marked information database 36, such as a timestamp indicating the time at which the probe was received or responded to, the identity of which of the marked information modules 30 generated the marked information, or other information.

Marked information modules 30 monitor incoming communications for marked information. In particular, marked information modules 30 compare information contained in the communications to the information recorded within marked information database 36 to determine whether the communications include marked information. If any of the communications includes marked information, marked information modules 30 pass the detected communication to controller 32, which performs a correlation to identify patterns of an attacker.

For example, controller 32 may correlate the attacker's reconnaissance activities, e.g., the probing, with the subsequent attacks. Controller 32 searches marked information database 36 to identify the network address of the attack device 18 that was issued the marked information. Consequently, even if the attacker that received the marked information used a different computing device to launch the attempted attack, controller 32 is able to correlate the probing and the attack based on the unique marked information received from marked information modules 30. Using the recorded marked information, controller 32 can also perform more complex correlations to detect larger patterns of the attacker. Controller 32 may, for example, detect whether the attacker has probed other machines in protected network 12, find any probes that occurred around the same time, identify all network addresses that come from the same class C address space as the addresses used in the attack and the correlated probe, assess the delay between the probe and the attack, determine the overall scope of the attack (e.g., how many machines were targeted or the frequency of the attack), or perform other correlations.

Additionally, controller 32 may access marked information database 36 to extract information necessary to answer queries. Controller 32 may respond to queries from other attack correlation systems 14, from a central node 24, or from a console user (e.g., a system administrator 40). Controller 32 may, for example, receive a command from system administrator 40 to provide a summary of probes and attempted attacks on protected network 12. Controller 32 accesses marked information database 36 and provides system administrator 40 with a summary of the probes and attempted attacks, including the recorded information associated with the attacks (e.g., network addresses of probing devices and attacking devices, ports, protocols, and other information associated with each set of marked information.) In addition, controller 32 may distribute a summary to other attack correlation systems throughout network 16 in order to provide broader awareness of potential attackers and attack techniques.

In addition, controller 32 or marked information modules 30 notifies response module 38 of the detected marked information, and response module 38 responds to the attempted attack. Response module 38 may, for example, send an electronic message to system administrator 40, reconfigure a firewall associated with protected network 12, or other similar responsive action.

In some embodiments, one or more of marked information modules 30 couple to a vulnerable device 42. Vulnerable device 42 may be viewed as a form of "honeypot" as it is configured in a manner that can easily be "hacked." As a result, vulnerable device 42 lures potential attackers to allow a system administrator to study their activities and monitor methods used by the attacker. In particular, in this embodiment, marked information modules 30 reroute the communications having the marked information to vulnerable device 42, which in turn responds to the communications.

In one embodiment, vulnerable device 42 is a dedicated computing device that runs real network services corresponding to the services offered by other devices within protected network 12. For example, one or more marked information modules 30 may reroute communications to a computing device running an actual instance of the Windows™ operating system. In this manner, marked information modules 30 may be viewed as acting as proxy devices between the dedicated vulnerable device 42 and attack device 18. Vulnerable device 42 may be coupled to marked information modules 30 via a separate Ethernet connection or other connection which isolates vulnerable device 42 from the protected network 12.

In another embodiment, vulnerable device 42 is a virtual vulnerable device instead of an actual dedicated computing device. The virtual vulnerable device may, for example, comprise a number of services running on virtual infrastructure software, such as VMware® or similar virtual infrastructure software. The virtual infrastructure software provides an operating environment for the virtual vulnerable device, including an operating system and network services associated with the virtual vulnerable device. Running a virtual vulnerable device within attack correlation system 14 may provide certain benefits, such as the ability to quickly terminate and restart the virtual vulnerable device. This allows attack correlation system 14 or a system administrator to quickly return the virtual vulnerable device to an uncompromised state once the device has been compromised by an attacker. For example, the virtual vulnerable device may be restarted by simply copying a fresh version (image) of its boot disk from a protected archive, thus quickly restoring the operating system and other services to an uncompromised state. Although described above in terms of a single virtual vulnerable device, attack correlation system 14 may include a plurality of virtual vulnerable devices. Attack correlation system 14 may, for example, generate a virtual vulnerable device associated with each set of marked information. In this manner, attack correlation system 14 assumes the identity of the virtual device associated with the marked information.

In general, attackers 18 are unaware that they are communicating with vulnerable device 42, and perform their attacks as if vulnerable device 42 were a node in protected network 12. Attack correlation system 14 logs and analyzes the communications with vulnerable device 42 to identify weaknesses in the security of protected network 12, including the network services offered by the devices of the network. Alternatively, or in addition, a system administrator or software application may analyze the communications logged by attack correlation system 14. Attack correlation system 14, the system administrator or the software application may generate a "signature" of the attack based on the communication logged by vulnerable device 42. The signature may be thought of as a pattern of attack events that identifies a particular attack. The signature of the attack may be generated from information contained in the communications from the attacking devices, timing of the communications from the attack device of the like. The system administrator or software application may notice a pattern in the length of time between the initial probe and the first attack communication, the amount of time between subsequent attack communications, or the like.

Attack correlation system 14 may include a variety of marked information modules, each providing marked information for different applications. In one exemplary embodiment, at least one of marked information modules 30 dynamically generates unique password files or other sensitive files to probing attack devices. For example, an attempt by one of attack devices 18 to download a file via the file transfer protocol (FTP) invokes a script that checks whether the name of the requested file is on a list of sensitive files. Marked information module 30A may, for example, determine that a password file "/etc/password" is a sensitive file. In that case, when an attacker attempts to download the file, marked information module 30A accesses marked information database 36 and determines whether the attack device attempting the download has requested the file before. If so, marked information modules 30A provides the probing attack device with the same unique password file previously provided to the attacker, thus making attack correlation system 14 difficult to detect.

If attack device is not recognized, marked information modules 30A generates a unique fake password file, allows the download of the fake password file in normal course and records in marked information database 36 information associated with the downloading device as well the fake password file provided. In this embodiment, the fake password file provided to the downloading attack device is the dynamically generated marked information. In this manner, the fake password file is generated "on the fly" and no two attack devices are given the same password file. This allows intrusion detection devices to correlate an attacker's reconnaissance activities with subsequent attacks.

Attack correlation system 14 allows the attacker, whether launching an attack from the same device used to probe or from a different device, to log in using the false password as if the attacker were logging into a node within protected network 12. When the attacker logs in with passwords from the fake password file provided, i.e., the marked information, attack correlation system 14 logs the attacker into vulnerable device 42 and responds to the attack as described above.

In another exemplary embodiment, at least one of marked information modules 30 provides dynamically generated IP address and port number combinations to probing attack devices 18. If a network has a class C address, for example, it is unlikely that all the 254 addresses are used up and the marked information module dynamically selects on of the unused IP addresses from the address space and dynamically generates a port number for the selected IP address.

Other marked information modules 30 may provide other "types" of marked information. For example, one or more of the marked information modules 30 may provide marked information in the form of a false network link or uniform resource locator (URL) that has a unique hostname to a probing attack device 18. Other types of marked information that may be dynamically generated include an unused IP address, a storage resource (share), a port number or combinations thereof.

Marked information modules 30, controller 32, response module 38 and vulnerable device 42 may be implemented solely in software, or hardware, or may be implemented as a combination of software, hardware, or firmware. For example, marked information modules 30, controller 32, response module 38 and vulnerable device 42 may include one or more processors which execute software instructions.

FIG. 4 is a block diagram illustrating an exemplary data stored within marked information database 36 (FIG. 3) maintained by attack correlation system 14. For purpose of illustration, data stored within marked information database 36 is illustrated as a table in which each row represents a response to a probe from one of attack devices 18. In practice, marked information database 36 may be a relational database or other type of database management system. Moreover, the data need not be stored in a database, and may be stored in any of a variety of forms, such as arrays, linked lists, files and the like.

As described above, attack correlation system 14 dynamically generates unique marked information for probes from each of attack devices 18, thus allowing attack correlation system 14 to correlation between the reconnaissance activities and the subsequent attacks. In the example illustrated, each of the responses to the probes includes a marked information module identification number (MARKED INFO MODULE ID), an IP address of the probing device (PROBING IP ADDRESS), a timestamp indicating the time at which the response to the probe was sent (TIMESTAMP), the marked information sent in the response to the probe (MARKED INFO), and an IP address of one or more computing devices that launched a subsequent attack using the marked information (SUBSEQUENT ATTACK IP ADDRESS).

The data of FIG. 4 is illustrated for exemplary purposes, and may be readily varied. For example, although FIG. 4 illustrates a marked information data structure in which the marked information is all passwords, the marked information data structure may store a plurality of different types of marked information, such as passwords, IP address and port number pairs, URLs, names of dynamically generated files, and the like. Furthermore, marked information database 36 may include additional information, such as an IP address of the destination device within protected network 12, a destination port number, and the type of packet. Marked information database 36 may also include attempted attack information gathered by other attack correlation systems. For example, marked information database 36 may include an IP address of an attack device that probed other protected systems as well as a timestamp associated with the probing.

Figure 5:
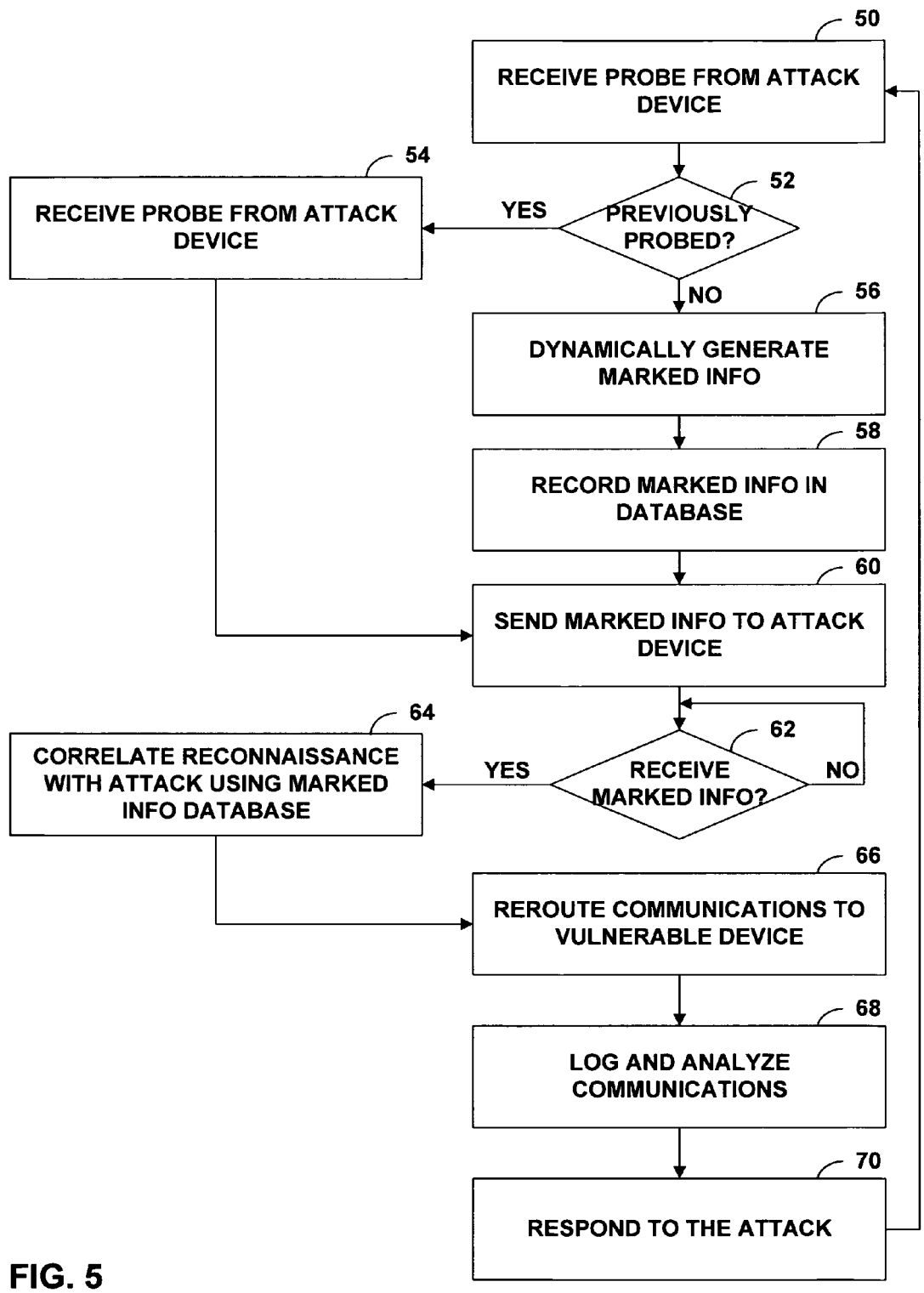
FIG. 5 is a flow diagram illustrating exemplary operation of the attack correlation system thwarting attempted attacks in accordance with the techniques described herein.

FIG. 5 is a flow diagram illustrating exemplary operation of an attack correlation system, such as attack correlation system 14, thwarting attempted attacks in accordance with the techniques of the invention. Initially, attack correlation system 14 and, more particularly, one of marked information modules 30 receive a probe from an attack device 18 (50). For example, an attacker using attack device 18 may be performing reconnaissance in order to determine the weaknesses of protected system 12. Attack correlation system 14 determines whether attack device 18 has previously probed attack correlation system 14 (52). Attack correlation system 14 may, for example, access marked information database 36 and search for an IP address or other information associated with probing attack device 18. If attack device 18 has previously probed attack correlation system 14 one of the entries in marked information database 36 will include the IP address or other information associated with attacking device 18 as well as the marked information previously sent to attack device 18. In this case, attack correlation system 14 resends the same marked information to attack device 18.

If attack correlation system 14 has not previously responded to a probe from attack device 18, e.g., if the IP address associated with attack device 18 is not found in marked information database 36, then attack correlation system 14 dynamically generates a set of marked information (56). Attack correlation system 14 may "dynamically generate" the marked information by actually creating the information based on predefined rules or by selecting the marked information from an archive containing information previously designated for use as marked information. As described above, the marked information generated for each attack device is unique to that attack device. The marked information may, for example, comprise a false password file, a false URL or link, a false IP address and port number, or the like.

Attack correlation system 14 makes an entry in marked information database that includes the IP address associated with attack device 18 as well as the marked information supplied to attack device 18 (58). The entry in marked information database 36 may include additional information, such as a timestamp indicating the time at which the response was sent, a marked information module identification, a destination IP address, a destination port number, and the like. Attack correlation system 14 sends a response to attack device 18, which includes the marked information (60).

Attack correlation system 14 monitors communications to protected network 12 for communications that include marked information (62). When attack correlation system 14 detects a communication that includes marked information, attack correlation system 14 performs a correlation to identify patterns of the attacker, such as a correlation between the reconnaissance activities with the subsequent attacks using the stored marked information (64). In addition, attack correlation system 14 allows the attacker to communicate with a vulnerable device, which emulates a computing device within protected network 12 (66). As described above, the vulnerable device may be a dedicated computing device running fake services similar to devices within protected network 12. Alternatively, the vulnerable device may be a virtual vulnerable device running virtual services on a virtual infrastructure software such as VMware®. As described above, attack correlation system 14 may generate a virtual vulnerable device that is associated with each set of marked information. In this manner, attack correlation system 14 assumes the virtual vulnerable device associated with the particular set of marked information contained in the communication.

The vulnerable device logs and optionally analyzes communications between attack device 18 and the fake services (68). Attack correlation system 14 can thus monitor the attacker's methods within the vulnerable device to assist system administrators in identifying vulnerabilities of the protected network and nodes within the network, learn new attack techniques, and the like. Additionally, attack correlation system 14, the system administrator or the software application may generate a "signature" of the attack based on the communications logged by vulnerable device 42. The signature of the attack may be generated from information contained in the communications from the attacking devices, timing of the communications from the attack device or the like. The system administrator or software application may notice a pattern in the length of time between the initial probe and the first attack communication, the amount of time between subsequent attack communications or the like.

Furthermore, attack correlation system 14 responds to the attempted attack (70). Attack correlation system 14 may, for example, reconfigure one or more firewalls associated with protected network 12 to block communications associated with the attack device identified as sending the communication that includes the marked information. As other examples, attack correlation system 14 may send an alert message to a network administrator, other intrusion detection devices, a central node that coordinates operations of multiple intrusion detection devices, or the like.

Figure 6:
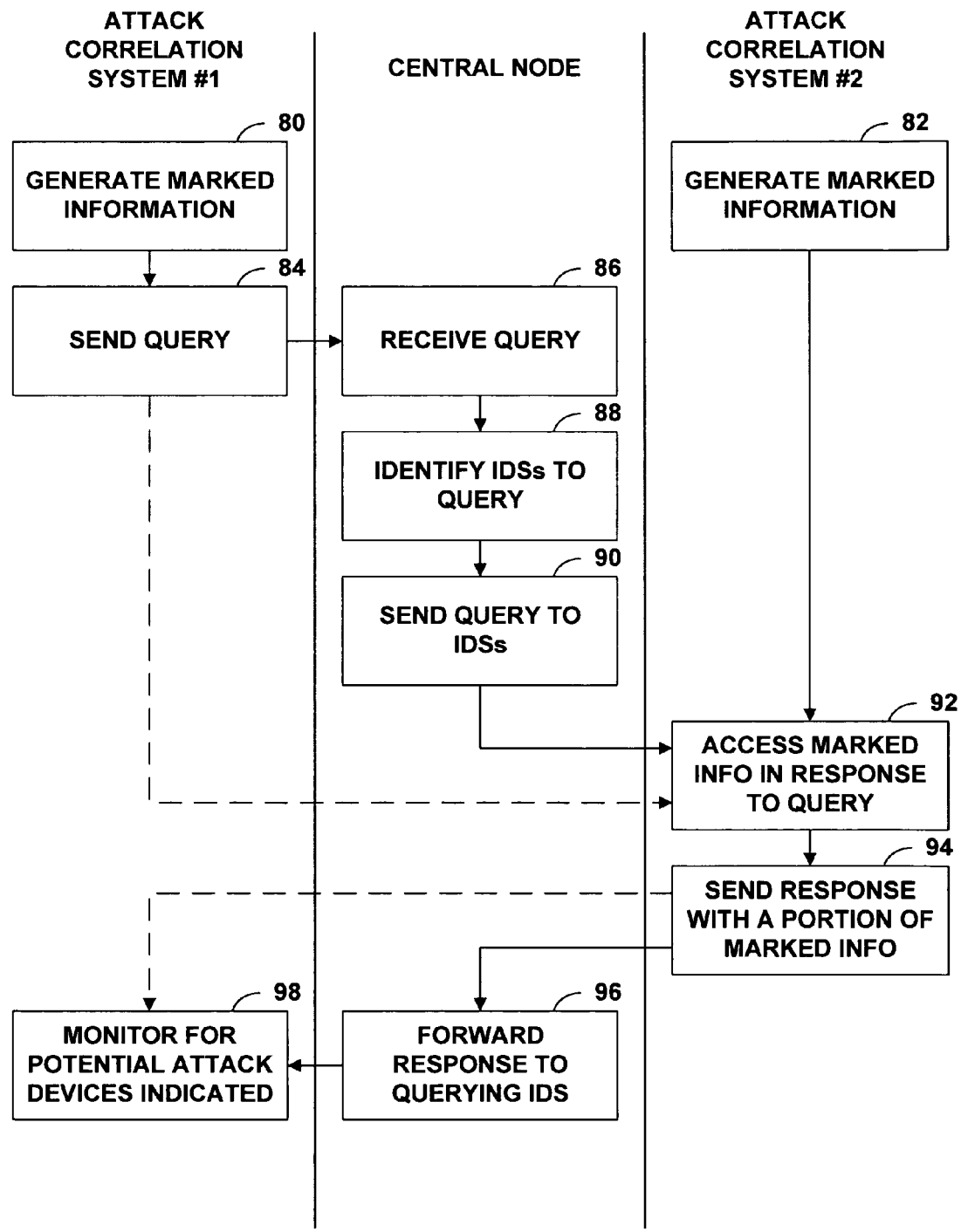
FIG. 6 is a block diagram illustrating exemplary operation of multiple attack correlation systems exchanging attempted attack information in order to gain broader awareness of potential attackers.

FIG. 6 is a block diagram illustrating exemplary operation of multiple attack correlation systems exchanging attempted attack information in order to gain a broader awareness of potential attackers. Initially, each of attack correlation systems generates (e.g., creates or selects) an associated set of marked information (80, 82). As described above, marked information includes identifications, such as IP addresses, of potential attack devices 18, such as those computing devices used for reconnaissance and subsequent attacks. The attack correlation systems respond to probes with the marked information and correlate attack devices that send communications that include marked information with the associated probing device.

In this example, attack correlation system #1 sends a query to a central node to collect information regarding attempted attacks monitored by other attack correlation systems 14 (84). The central node receives the query (86), identifies which of the attack correlation systems to query (88), and issue respective queries to the identified attack correlation systems (90), which in this example is attack correlation system #2. Attack correlation system #1 may, for example, specify a particular attack correlation system from which it would like to receive attempted attack information. Otherwise, the central node may determine which of the attack correlation systems run similar marked information modules. For example, the central node may identify all attack correlation systems that include a marked information module that issues "marked" URLs.

Attack correlation system #2 receives the query from central node 24, accesses its generated marked information (92) and sends a response that includes at least a portion of the marked information (94). Attack correlation system #2 may, for example, send a response that includes the IP addresses of potential attack devices and information describing any determined correlation of reconnaissance and subsequent attacks. In this manner, attack correlation system #2 does not have to provide any sensitive information to other attack correlation systems.

The central node receives the response, possibly records the response, and forwards the response on to the querying attack correlation system #1 (96). Attack correlation system #1 uses the information received from the query to increase its effectiveness in detecting network attacks and correlating subsequent attacks (98). For example, attack correlation system #1 may use the information provided by attack correlation system #2 for initially flagging suspicious activity, for correlating the size of the attack over the entire network or the like.

In an alternative embodiment, the central node may periodically query each of attack correlation systems and maintain a database with information regarding probes and attempted attacks. In that case, the central node may simply access the database and retrieve the relevant information and to respond to queries and/or generate reports for each attack correlation system. In another embodiment, attack correlation system #1 may directly query attack correlation system #2 as indicated by the dashed lines.

Figure 7:
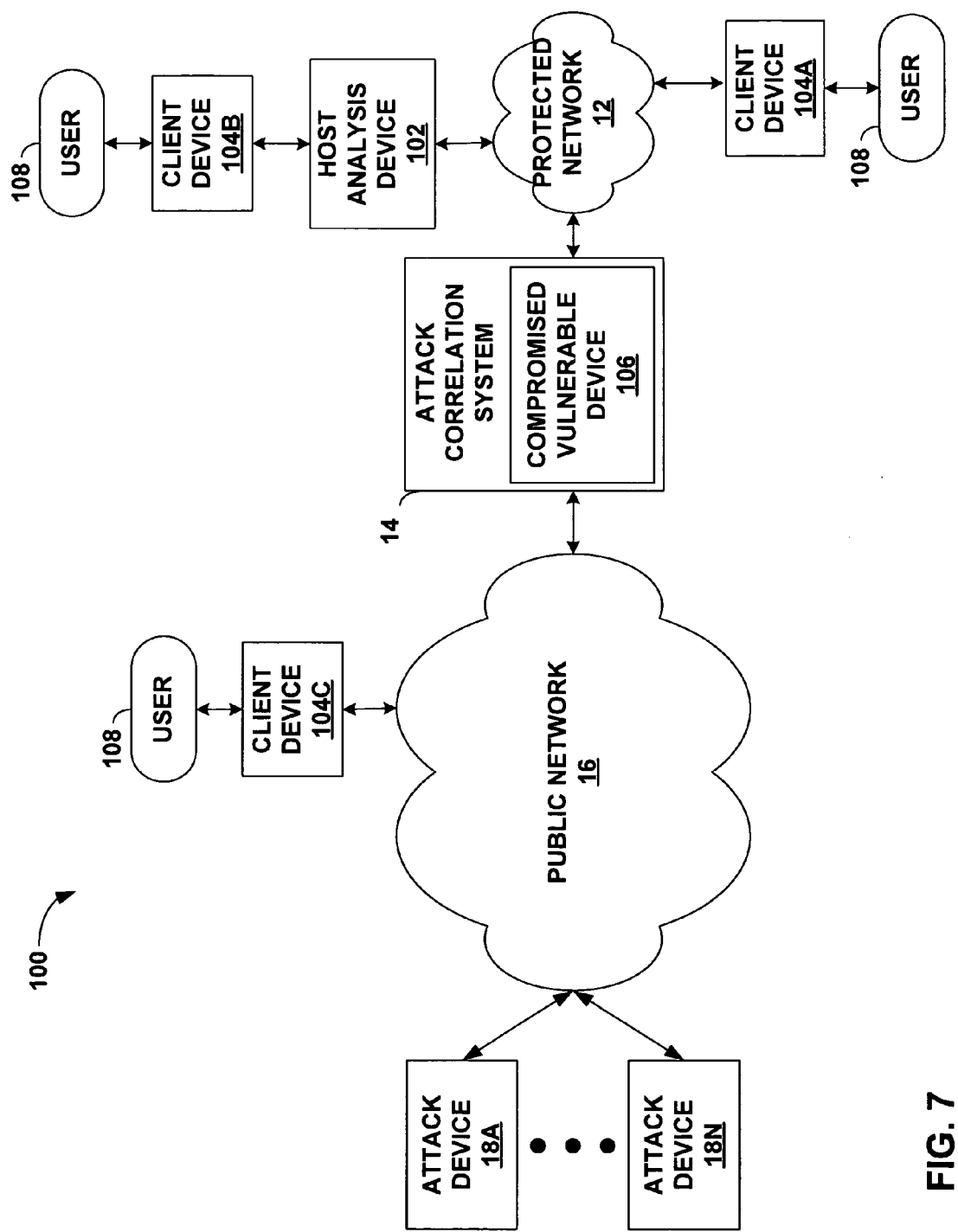
FIG. 7 is a block diagram of an exemplary system in which attack a correlation system operates in conjunction with a host analysis device to generate more detailed information regarding attempted attacks.

FIG. 7 is a block diagram of an exemplary system 100 in which attack correlation system 14 operates in conjunction with a host analysis device 102 to generate more detailed information regarding attempted attacks. In general, host analysis device 102 retrieves and analyzes host information from a compromised vulnerable device 106 associated with attack correlation system 14. Host analysis device 102 allows a client device, such as any of client devices 104A-104C (collectively, "client devices 104"), operated by a respective one of users 108, to interrogate the compromised vulnerable device 106 in order to collect and analyze host information that may be stored on the compromised vulnerable device 106. The host information collected by host analysis device may be used in conjunction with the marked information to better identify attack methods.

A client device, such as any one of client devices 104, is coupled to host analysis device 102. Client devices 104 can be coupled to host analysis device 102 in a number of different manners. In one embodiment, a client device (e.g., client device 104A) and host analysis device 102 are connected to a common network, such as protected network 12, and client device 104A connects user 108 to host analysis device 102 via a secure connection through protected network 12. In this manner, all the data sent between host analysis device 102 and user 108 is encrypted to prevent unauthorized access to the data. Host analysis device 102 may, for example, use a communication protocol such as HTTPS (hypertext transfer protocol with SSL, secure socket layer) to encrypt and transmit data securely to user 108. In another embodiment, the client device (e.g., client device 104B) connects user 108 to host analysis device 102 via public network 16. Client device 104B may, for example, be configured to access host analysis device 102 through a local network firewall or other network infrastructure of protected network 12. In a further embodiment, the client device (e.g., client device 104C) connects user 108 directly to host analysis device 102 instead of connecting to host analysis device 102 via a network. Client device 104C may be configured, for example, to access host analysis device 102 via a direct communication link, such as a phone line, a universal serial bus (USB), a wireless port, a serial port, a parallel port, an infrared (IR) link or any other type of direct connection.

In general, host analysis device 102 is typically connected to the same local subnet as the compromised vulnerable device 106, although this is not required. For example, in an embodiment in which protected network 12 includes more than one LAN, host analysis device 102 may be connected to the same LAN as the compromised vulnerable device 106. Host analysis device 102 may, for example, obtain an Internet Protocol (IP) address within the subnet scope of the LAN to which the compromised vulnerable device 106 is connected. Host analysis device 102 may obtain the IP address dynamically, e.g., via Dynamic Host Configuration Protocol (DHCP), or statically via configuration by a network administrator.

As described in detail above, the vulnerable device is part of attack correlation system 14 and, may be a dedicated computing device or a number of processes running on a virtual infrastructure. Host analysis device 102 may comprise a laptop computer, network appliance, or other computing device that includes a web server for communicating with client device 104 and one or more interrogation agents that acquire data from the operating system of the compromised vulnerable device 106. In one embodiment, host analysis device 102 may be a forensic device as disclosed in U.S. patent application Ser. No. 10/608,767, filed Jun. 23, 2003, incorporated herein by reference.

As will be described in further detail below, host analysis device 102 allows user 108 to create an inquiry to acquire host information from the compromised vulnerable device 106. Host information may include information in a registry associated with the compromised vulnerable device 106, a list of processes running on the compromised vulnerable device 106, a list of services installed on the compromised vulnerable device 106, a configuration file of the compromised vulnerable device 106, and the like.

Host analysis device 102 may present a login screen to user 108 via which user 108 inputs a username and password to connect to host analysis device 102. User 108 may then input target device information to define the inquiry. Target device information defines characteristics associated with compromised vulnerable device 106, such as a host name of the compromised vulnerable device 106, an IP address associated with the compromised vulnerable device 106, a type of operating system run by the compromised vulnerable device 106, a password for accessing the compromised vulnerable device 106, and one or more methods for accessing the compromised vulnerable device 106, e.g., via invoking a Windows Management Instrumentation (WMI) or Server Message Block (SMB) client. User 108 may obtain at least a portion of the target device information from a network administrator or other individual prior to logging into host analysis device 102. Host analysis device 102 generates a new inquiry based on the information input by user 108.

Host analysis device 102 presents to user 108 a comprehensive list of possible acquisition operations that host analysis device 102 can perform for the created inquiry. The term "acquisition operation" refers to commands that host analysis device 102 issues to the compromised vulnerable device 106 to acquire host information, referred to herein generally as "data," from the compromised vulnerable device 106. User 108 specifies a combination of the acquisition operations to perform.

In response, host analysis device 102 initiates the acquisition operations on the compromised vulnerable device 106 via one or more of the identified access methods to acquire data from the compromised vulnerable device 106. As will be described, host analysis device 102 may acquire the host information from the compromised vulnerable device 106 while the compromised vulnerable device 106 is active. In other words, host analysis device 102 acquires the host information from the compromised vulnerable device 106 without the compromised vulnerable device 106 being physically seized or otherwise "shut down." Additionally, host analysis device 102 may acquire the host information from the compromised vulnerable device 106 without having to pre-load acquisition software on the compromised vulnerable device 106 prior to acquiring the host information, i.e., prior to host analysis device 102 beginning the investigation. In this manner, host analysis device 102 allows user 108 to acquire the host information from the compromised vulnerable device 106 with a reduced impact on the compromised vulnerable device 106.

In accordance with one aspect of the invention, host analysis device 102 may perform the acquisition operations in a particular order to reduce the impact the operations have on other data stored within the compromised vulnerable device 106, thereby maintaining the integrity of the data. In other words, some of the acquisition operations can change other data stored within the compromised vulnerable device 106. For example, acquisition operations performed before the acquisition operation for acquiring Ethernet statistics may change the Ethernet statistics, e.g., increase the unicast packet count. In this case, the acquisition operation to acquire the Ethernet statistics as well as any other acquisition operation whose associated data may be changed by performance of other acquisition operations should be performed early in the initial acquisition process. Host analysis device 102 may use different access methods for acquisition operations based on the type of data to be acquired from the compromised vulnerable device 106.

Host analysis device 102 provides user 108 with data analysis tools for viewing and analyzing the data acquired from the compromised vulnerable device 106. The data analysis tools may include, for example, a time analysis tool, a file viewer, an initial configuration file, and network tools. Host analysis device 102 may acquire host information from the compromised vulnerable device 106 and allow user 108 to view and analyze the host information via the data analysis tools with the data on-line. In this manner, user 108 does not have to go "off-line" to analyze the acquired data. In some cases, host analysis device 102 may even allow user 108 to view and analyze previously acquired host information while host analysis device 102 collects additional host information. In this manner, the collection and analysis of host information may be done in parallel. As will be described, the time analysis tool may be used to analyze log files for tampering. Log files include system event log, application event log, security event log, web server log files, Unix SYSLOG files, mail log files, accounting log files, and router flow log files, and other files that maintain a list of operations performed by the compromised vulnerable device 106. More specifically, the time analysis tool may analyze the log files to verify the log file entries are in chronological order, to detect anomalous gaps in the log entries, and to detect the absence of expected periodic log entries. The initial configuration file 102 allows host analysis device 102 or a system administrator to compare the initial configuration of the vulnerable device before being compromised with the configuration of the device after being compromised. Host analysis device or a system administrator may identify, for example, the types of processes the attacker runs on the compromised vulnerable device 106 or other more specific attack methods used by the attacker.

After viewing and analyzing a portion of the data, user 108 may determine whether acquisition of more data is necessary. Host analysis device 102 further provides user 108 with the ability to acquire supplementary data in addition to the data acquired in the initial acquisition. In some embodiment, attack correlation system 14 automatically takes a "snapshot" of compromised vulnerable device 106, stores the snapshot and then restores the vulnerable device to its non-compromised state.

From the analysis of the data acquired from the compromised vulnerable device 106, user 108 may be able to better determine attack methods used by attack devices 18. User 108 may, for instance, determine the types of processes running on a compromised device, the types of services running on a compromised device, and the like. In one embodiment, attack correlation system 14 may periodically query host analysis device 102 to retrieve host information and incorporate the host information into attempted attack analysis. Attack correlation system 14 may, for example, store host information retrieved from host analysis device 102 in marked information database 36. Using this information, user 108, attack correlation system 14, or a software agent may be able to more accurately calculate a "signature" for the attack, using the marked information stored in marked information database 36 in conjunction with the host information. In addition to the system administrator or software application noticing a pattern in the length of time between the initial probe and the first attack communication, for example, the system administrator or software application may notice the types of processes the attacker runs or the type of software the attacker installs. In addition, attack correlation system 14 may exchange the host information along with the marked information as described in detail above.

Although the example of FIG. 7 illustrates host analysis device 102 monitoring a single compromised vulnerable device 106 for exemplary purposes, host analysis device 102 may monitor a plurality of compromised vulnerable devices 106.

Figure 8:
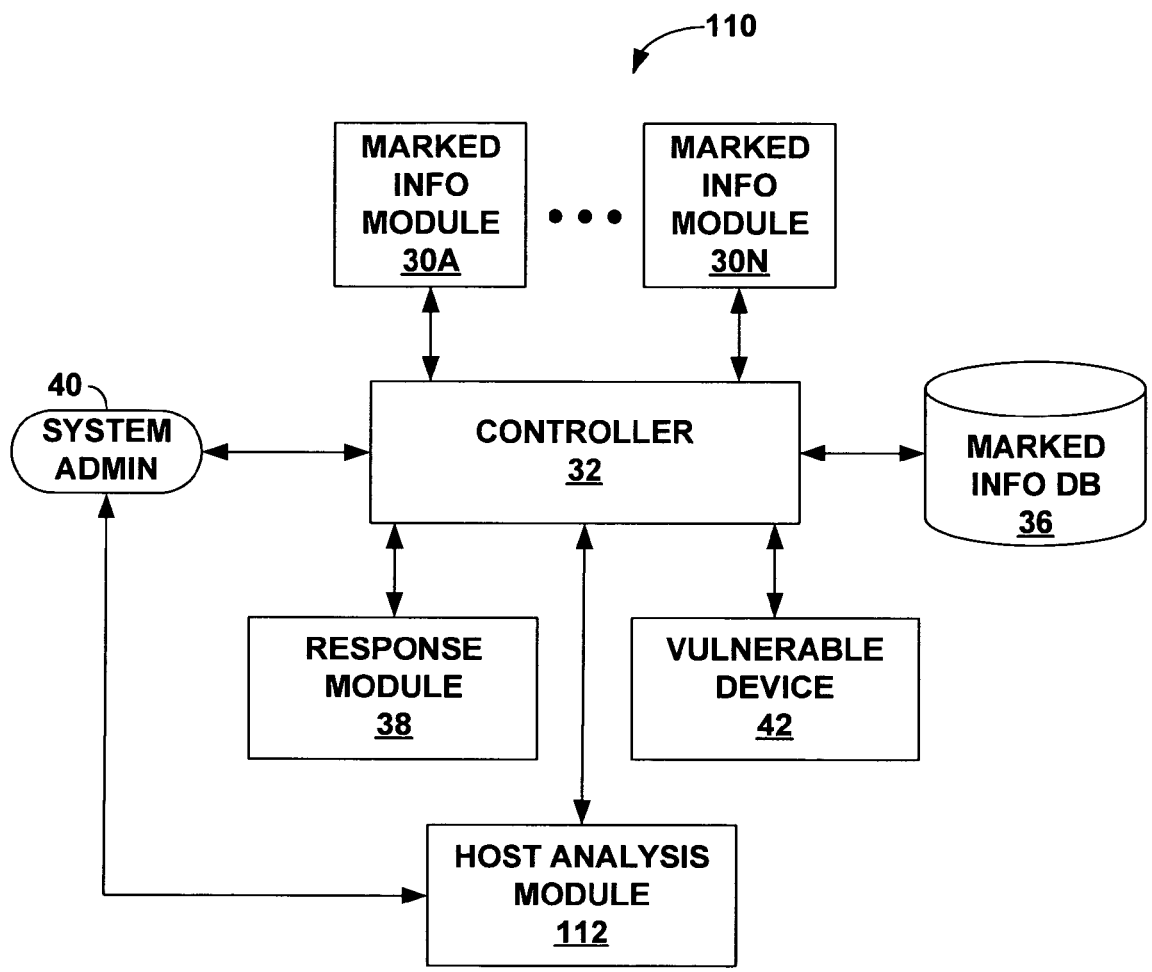
FIG. 8 is a block diagram of another exemplary attack correlation system.

FIG. 8 is a block diagram of another exemplary attack correlation system 110. Attack correlation system 110 conforms substantially to attack correlation system 14 of FIG. 3, but attack correlation system 110 includes a host analysis module 112 for acquiring host information as described above. Host analysis module 112 comprises one or more software modules executing within one of the devices of attack correlation system 110. Host analysis module 112 may be executing, for example, within one of marked information modules 30 or within controller 32. In one embodiment, host analysis module 112 may comprise a virtual host analysis module executing on a virtual infrastructure. Host analysis module 112 operates in the same manner as host analysis device 102 of FIG. 7.

Figure 9:
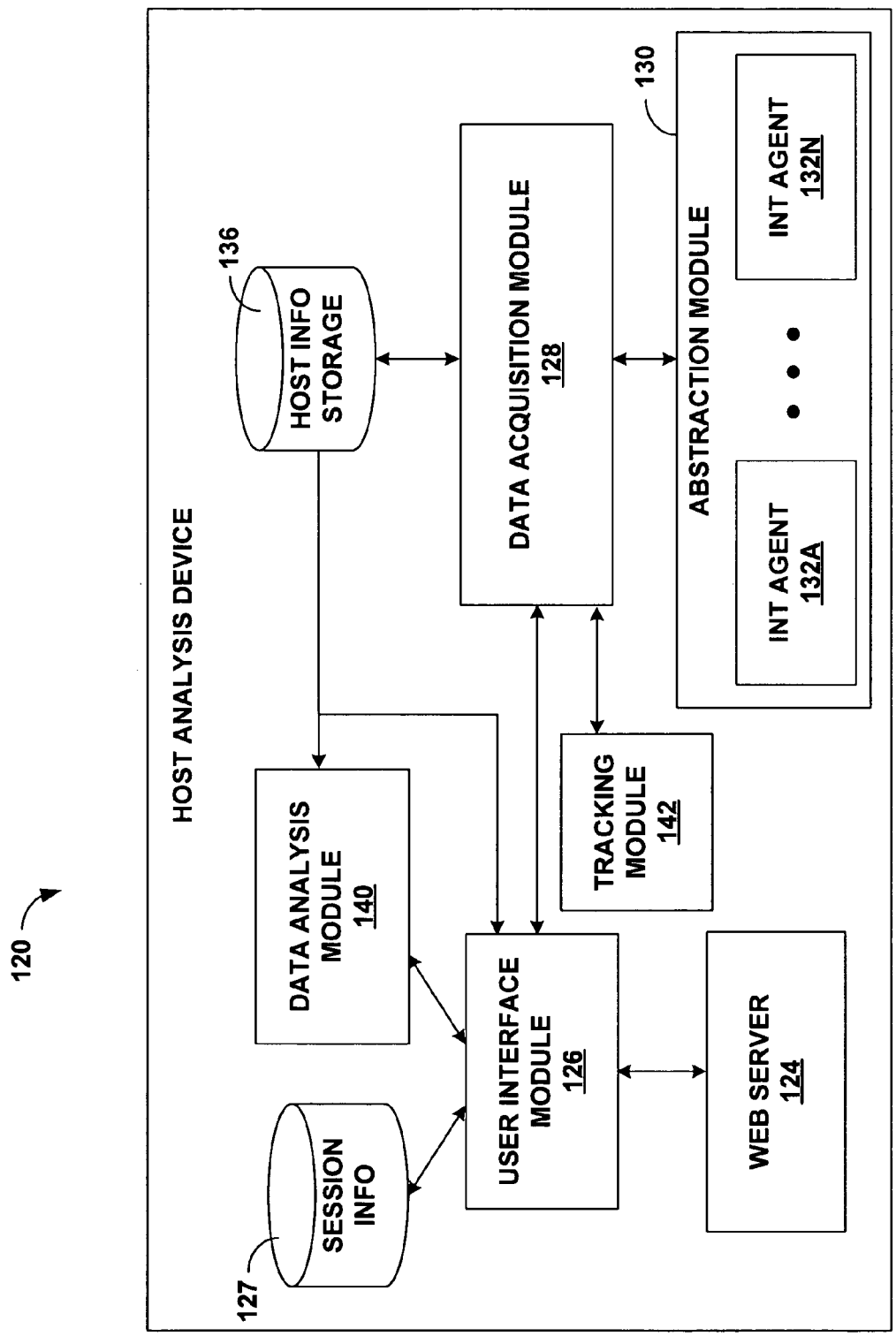
FIG. 9 is a block diagram illustrating an exemplary host analysis device in further detail.

FIG. 9 is a block diagram illustrating an exemplary host analysis device 120 in further detail. Host analysis device 120 may, for example, represent host analysis device 102 of FIG. 7. As described above, host analysis device 120 may be a mobile forensics device that allows a user to remotely interrogate one or more compromised vulnerable devices to acquire and analyze host information stored on the compromised vulnerable devices.

Host analysis device 120 includes a web server 124 that provides a seamless, network-based interface by which remote user 108 accesses host analysis device 120. More specifically, web server 124 provides a web-based interface by which user 108 interacts with host analysis device 120 via a network, either public or private. In one configuration, web server 124 executes web server software to provide an environment for interacting with user 108 via a user interface module 126. User interface module 126 may include Common Gateway Interface (CGI) programs and a graphical user interface (GUI) generator for generating and presenting user interfaces to user 108. In various embodiments, the interface presented by host analysis device 120 may include combinations of "server-side" user interface modules executing on web server 124 and "client-side" user interface modules, such as ActiveX® controls, JavaScripts™, and Java™ Applets, that execute on client device 14.

User 108 may connect to host analysis device 120 via a computer network using a web browser. User 108 may, for instance, connect to host analysis device 120 using the IP address assigned to host analysis device 120, e.g., using the IP address in a Uniform Resource Locator (URL) such as https://12.134.56.78/hostanlaysisdevice/index.html. Host analysis device 120 presents user 108 with a user interface for logging into host analysis device 120. Host analysis device 120 receives login data from user 108, such as a username and password, to verify the identity of user 108. Alternatively, host analysis device 120 may authenticate user 108 using a digital certificate. The connection through which user 108 connects to host analysis device 120 may be a secure connection through the network such that all the data sent between host analysis device 120 and user 108 is encrypted to prevent unauthorized access to the data.

Once user 108 is logged into host analysis device 120, host analysis device 120 presents user 108 with a list of current inquiries, as well as an option to create a new inquiry. User 108 may create a new inquiry to acquire data, e.g., host information, from one or more compromised vulnerable devices. Host analysis device 120 presents user 108 with one or more input screens to allow the user to input information necessary for the creation of the new inquiry. Host analysis device 120 may, for example, require user 108 to input target device information specifying a target device of the new inquiry. Target device information may include a target device host name, IP address, operating system, access methods and password. Host analysis device 120 generates a new inquiry based on the information input by user 108 and stores the inquiry data, e.g., target device information, in session information 127.

Host analysis device 120 presents to user 108 a set of possible acquisition operations that host analysis device 120 may perform for the newly defined inquiry. The initial acquisition operations include, for example, acquiring log files, communication statistics, e.g., Ethernet and protocol statistics, general system data, running process information, open network ports and associated processes, account information, file sharing information, and TCP/IP network information, and the like. User 108 may select a subset, all or none of the initial acquisition operations to be initially performed to acquire host information of the compromised vulnerable device. For example, user 108 may check a box located adjacent the acquisition operation to select the acquisition operation.

As described above, host analysis device 120 interrogates the compromised vulnerable device defined by user 108 to acquire the host information wanted by user 108. More specifically, host analysis device 120 includes a data acquisition module 128 and an abstraction module 130 that cooperate to acquire data from the compromised vulnerable device. Data acquisition module 128 notifies abstraction module 130 of the one or more acquisition operations to perform, and abstraction module 130 performs the acquisition operations to acquire the host information from the compromised vulnerable device.

Particularly, abstraction module 130 includes interrogation agents 132A-132N ("interrogation agents 132") that initiate acquisition operations based on the operating system executing on the compromised vulnerable device and the type of host information desired using one or more of the access methods defined in the corresponding inquiry. Each of interrogation agents 132 is configured to communicate with a particular type of operating system, e.g., Windows 2000®, Windows NT®, Unix®, MacOS™ and the like, via a number of executable files and a remote command execution tool. Particularly, the remote execution tool may relay the appropriate executable files to the compromised vulnerable device to obtain the data indicated by data acquisition module 128. In this manner, abstraction module 130 provides a layer of "abstraction" between interrogation agents 132 and data acquisition module 20, thereby allowing host analysis device 120 to be platform independent. As a result, host analysis device 120 may acquire data from a compromised vulnerable device regardless of the type of operating system executing on the compromised vulnerable device. Abstraction module 130 selectively invokes the appropriate interrogation agents 132 based on the input from remote user 108 identifying the operating system of the compromised vulnerable device.

Abstraction module 130 may further acquire data from the compromised vulnerable device using different access methods based on the type of data to be acquired from the compromised vulnerable device. For example, host analysis device 120 may perform an acquisition operation to acquire a log file via WMI while performing an acquisition operation to acquire network protocol statistics via SMB. Abstraction module 130 may be preconfigured to use specific access methods for acquiring specific types of data or user 108 may identify access methods for each of the acquisition operations.

Abstraction module 130 and, more particularly, a respective one of interrogation agents 132 may perform the specified combination of acquisition operations in a particular order to reduce the impact the operations on other data stored within the compromised vulnerable device, thereby maintaining and ensuring the integrity of the data.

Host analysis device 120 includes a data analysis module 140 that provides one or more data analysis tools to user 108 for viewing and analyzing the data. The data analysis tools may include, for example, a time analysis tool, a file viewer, an initial configuration file and network tools. As described, host analysis device 120 may acquire data from the compromised vulnerable device and allow user 108 to view and analyze the host information on-line via the data analysis tools. In some cases, host analysis device 120 may allow user 108 to view and analyze previously acquired host information while host analysis device 120 collects additional host information. The network tools allow user 108 to associate TCP/IP network connections with running processes, e.g., by port, by remote host name, or the like, to show all shared file systems to user 108, to show from which devices the target has drives/shares mounted, and the like.

From the analysis of the data acquired from the compromised vulnerable device, user 108 may be able to better determine attack methods used by attack devices 18. User 108 may, for instance, determine the types of processes running on a compromised device, the types of services running on a compromised device, and the like. Using this information, user 108, attack correlation system 14, or a software agent may be able to more accurately calculate a "signature" for the attack, using the marked information stored in marked information database in conjunction with the host information. In addition, attack correlation system 14 may exchange the host information along with the marked information as described in detail above.

Figure 10:
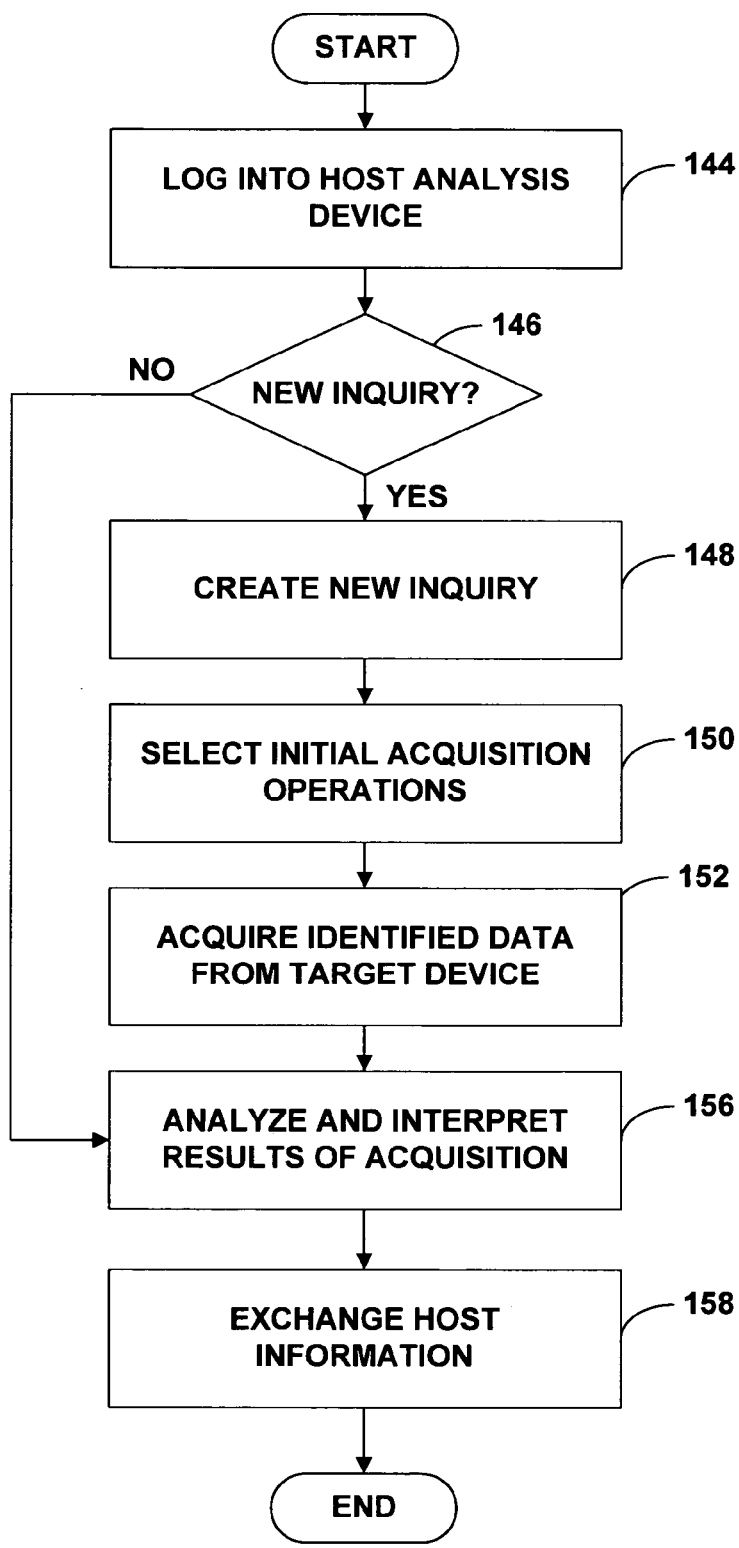
FIG. 10 is a flow diagram illustrating exemplary operation of the host analysis device.

FIG. 10 is a flow diagram illustrating exemplary operation of a host analysis device, such as host analysis device 102 of FIG. 7, host analysis module 112 of FIG. 8, or host analysis device 120 of FIG. 9, when acquiring and analyzing host information from a compromised vulnerable device. Initially, user 108 connects to host analysis device 102 via a web browser and inputs login information (144). For example, the host analysis device may present user 108 with a user interface for inputting a username and password to log into the host analysis device. Alternatively, the host analysis device may authenticate user 108 using a digital certificate or other digital credential.

Once user 108 is logged into the host analysis device, the host analysis device presents user 108 with a user interface to select either a previous inquiry or create a new inquiry (146). If user 108 selects from a previously defined inquiry, user 108 analyzes and interprets the collected host information (156). However, if user 108 does not select a previously defined inquiry, the host analysis device receives inquiry information from user 108 and creates an inquiry in accordance with the input (148). For example, the host analysis device may present user 108 with one or more screens to allow user 108 to input information necessary for the creation of the inquiry. The host analysis device may, for example, receive target device information from user 108 via the user interface. The target device information specifies a target device of the new inquiry. The host analysis device generates a new inquiry based on the data input by user 108 and stores the inquiry information, i.e., target information, in session information 127.

User 108 selects initial acquisition operations for the host analysis device to perform (150). For example, the host analysis device may present a set of potential acquisition operations for the newly defined inquiry and user 108 selects a subset, all or none of the initial acquisition operations to be initially performed.

The host analysis device interrogates the compromised vulnerable device defined by user 108 to acquire data, i.e., host information, from the compromised vulnerable device (152). More specifically, the host analysis device communicates commands to the operating system of compromised vulnerable device via one or more of the access methods defined in the corresponding forensic inquiry.

User 108 may use data analysis tools provided by the host analysis device to analyze and interpret acquired data, either data acquired by a new inquiry or data acquired in a previous inquiry (156). From the analysis of the data acquired from the compromised vulnerable device, user 108 may be able to better determine attack methods used by attack devices 18. User 108 may, for instance, compare the types of processes or services running on the vulnerable device before being compromised and after being compromised. Using this information, user 108, attack correlation system 14, or a software agent may be able to more accurately calculate a "signature" for the attack, using the marked information stored in marked information database in conjunction with the host information. Attack correlation system 14 may exchange the host information along with the marked information with other attack correlation systems (158).

Figure 11:
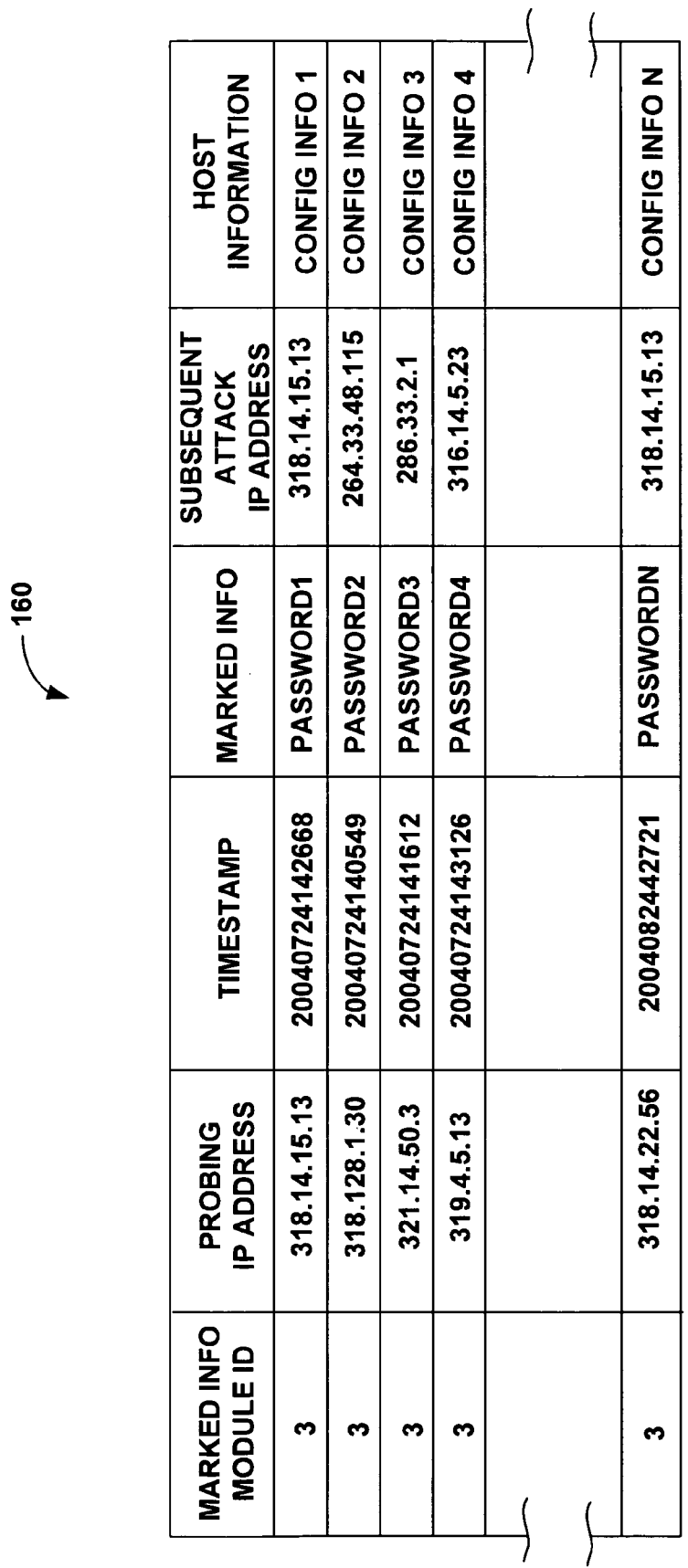
FIG. 11 is a block diagram illustrating an exemplary marked information database maintained by an attack correlation system.

FIG. 11 is a block diagram illustrating another exemplary marked information database 160 maintained by an attack correlation system. Marked information database 160 conforms substantially to marked information database 36 of FIG. 4, but marked information database 160 includes host information (HOST INFORMATION) associated with each of the responses to the probes. In this manner, marked information database 160 correlates the marked information with associated host information. Although in the example illustrated in FIG. 11 host information comprises configurations of compromised vulnerable devices, the host information in marked information database 160 may include other host information such as running process information, running services information, open DLL's and the like.

As described above, the attack correlation system may use the associated host information in conjunction with the other information stored in marked information database 160 to generate more detailed information regarding attempted attacks. The attack correlation system or a system administrator may, for example, be able to more accurately calculate a "signature" for the attack using the marked information stored in marked information database in conjunction with the host information.

Figure 12:
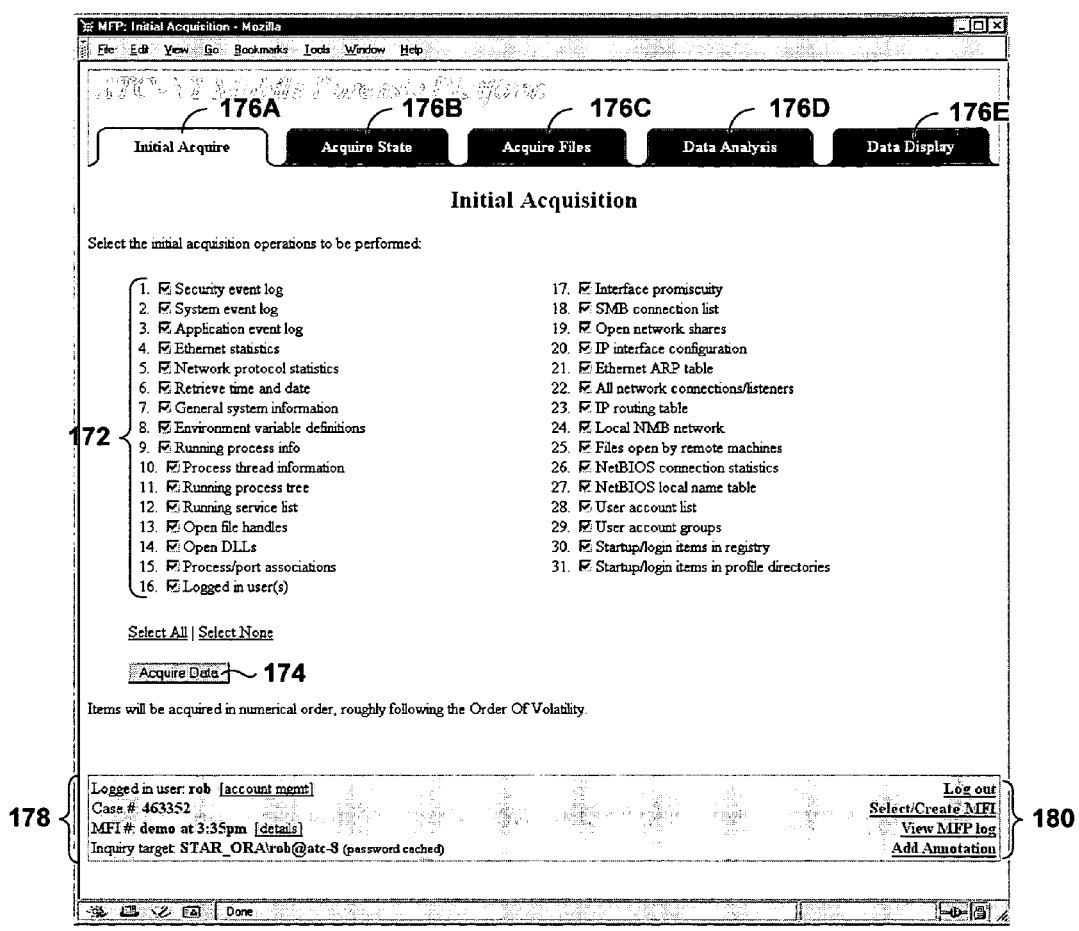
FIG. 12 is a screen illustration of an exemplary user interface with which a user interacts to specify a combination of one or more acquisition operations for a host analysis device.

FIG. 12 is a screen illustration of an exemplary user interface 170 with which user 108 interacts to specify a combination of one or more acquisition operations for a host analysis device, such as host analysis device 102 or host analysis module 112, to perform. User interface 170 includes an acquisition operation selection area 172, which user 108 interacts with to select one or more acquisition operations from the comprehensive set. Acquisition operation selection area 172 includes a list of acquisition operations with a box adjacent each of the acquisition operations. In this embodiment, user 108 clicks on the boxes adjacent the acquisition operations user 108 wants the host analysis device to perform. In the example illustrated in FIG. 12, user 108 has selected all of the acquisition operations, represented by the check marks within the selection boxes. In some embodiments, acquisition selection area 172 may have different methods for selecting the acquisition operations. For example, the acquisition operation selection area may include a list of acquisition operations and user 108 may drag desired acquisition operations from the list into a "perform acquisition operation" region. Once user 108 has selected the acquisition operations for the host analysis device to perform, user 108 may actuate an "acquire data" button 174 to initiate the initial data acquisition.

The acquisition operations listed in acquisition selection area 172 may be arranged and presented to user 108 in an order of "volatility" or impact the acquisition operation may have on the compromised vulnerable device. In other words, the host analysis device may list the acquisition operations according to the order in which the acquisition operations will be performed. As described above, the host analysis device may perform the acquisition operations in a particular order to reduce the impact the acquisition operations have on other data stored within compromised vulnerable device. Alternatively, the acquisition operations may be presented in no particular order, but upon actuation of acquire data button 174, the host analysis device may determine an order in which the acquisition operations are performed to reduce the impact the acquisition operations have on other data stored within the compromised vulnerable device.

User interface 170 further includes operation mode tabs 176A-176E ("operation mode tabs 176"). Operation mode tabs 176 correspond to different data acquisition and analysis operation modes of the host analysis device. Clicking on one of operation mode tabs 176 presents user 108 a user interface for the data acquisition or analysis operation mode associated with the respective operation tab 176. Particularly, operation tab 176A corresponds to the initial acquisition, operation tab 176B corresponds to acquisition of additional machine state information, operation tab 176C corresponds to acquisition of files from target device 16, operation tab 176D corresponds to data analysis tools for analyzing acquired data, and operation tab 176E corresponds to data viewing tools for displaying acquired data.

User interface 170 also includes an inquiry summary section 178 that illustrates to user 108 inquiry information associated with the forensic inquiry that is currently in session. Inquiry summary section 178 of FIG. 9 identifies the case number, the forensic inquiry mnemonic, and the inquiry target. Additionally, user interface 170 includes an action area 180 that includes links that user 108 can click on to perform different actions, e.g., a "log out" link that exits user 108 from the host analysis device, a "select/create" link that takes user 108 to a screen that illustrates a list of all inquiries, a "view log" link that takes user 108 to an audit log of transactions performed by user 108 or others, a "add annotation" link that allows user 108 to add comments.

FIG. 13 is a screen illustration of an exemplary user interface 186 for viewing host information acquired from the vulnerable device. In the example illustrated in FIG. 13, user interface 186 presents running process data acquired from the compromised vulnerable device. Specifically, user interface 186 includes a chart that includes a list of processes, and for each process lists an ID and priority, number of threads, number of file handles, memory use in kilobytes, user time, kernel time, elapsed time, and start time. User 108 may click on the process name to obtain more detailed information regarding the process.

Figure 14A:
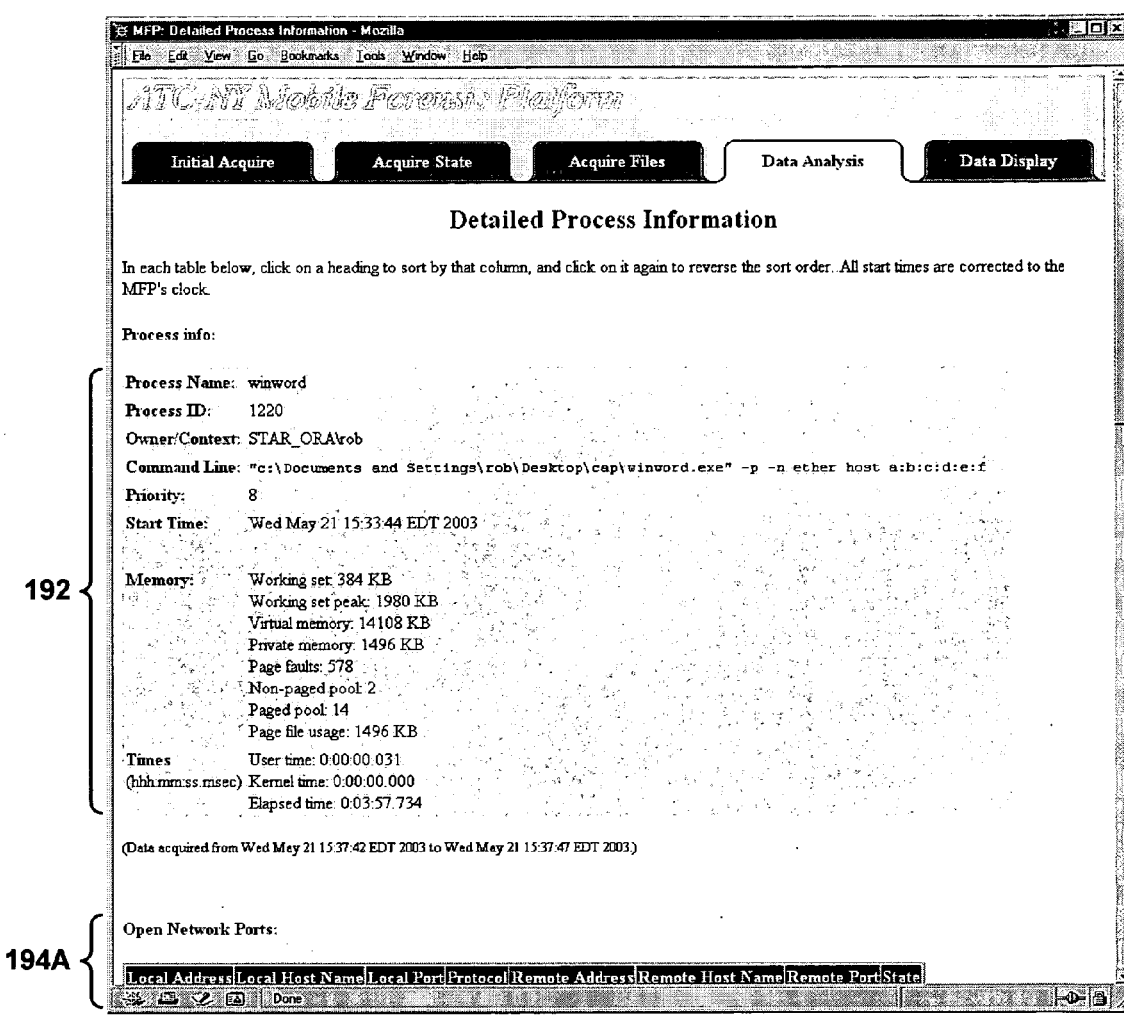
Figure 14B:
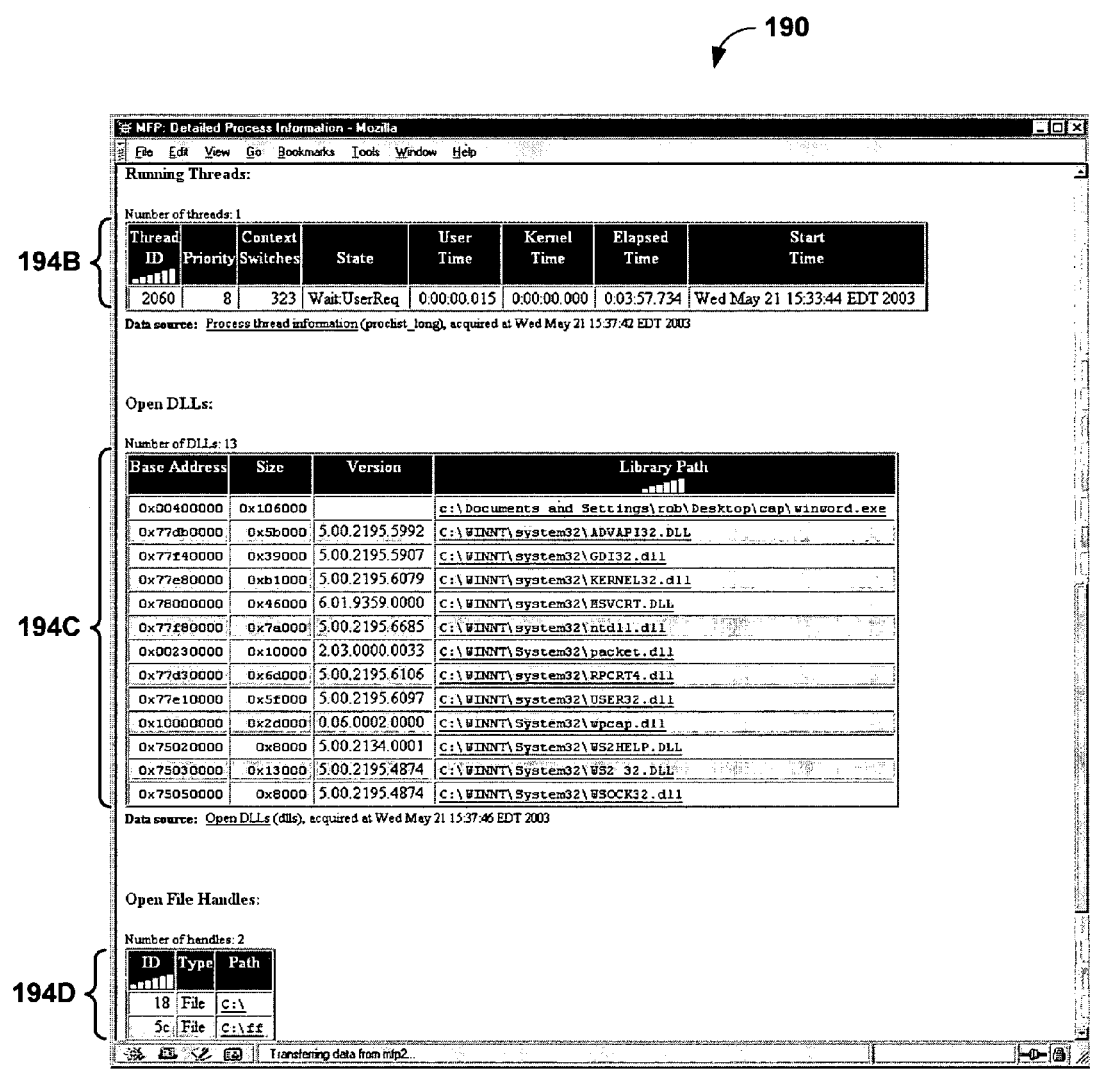

FIGS. 14A and 14B are screen illustrations of an upper and lower portion of an exemplary user interface 190 presented to user 108 upon clicking on a process name in user interface 186 of FIG. 13. More specifically, in this example, user interface 190 shows process WINWORD in detail. As illustrated in FIG. 14A, user interface 190 includes a process information section 192 that includes process name, ID, owner/context, command line, priority, start time, memory usage, and different times, e.g., user, kernel, and elapsed. As illustrated in FIGS. 14A and 14B, a lower region of user interface 190 shows charts 194A-194D (collectively, "charts 194") of different process attributes such as an open network port chart, a running thread chart, open DLL chart, and open file handle chart. User interface 190 may include numerous other charts illustrating other process attributes, such as an open network port chart.

Various embodiments of the invention have been described. These and other embodiments are within the scope of the following claims.

The invention claimed is:

1. A method comprising:
receiving, by an attack correlation system of a protected network, a probe communication from a probing computing device;
in response to the probe communication, accessing a database maintained by the attack correlation system to determine whether the probing computing device has previously probed the protected network;
when the probing computing device has not previously probed the protected network, dynamically generating marked information, storing the marked information to be associated with an identification of the probing computing device within an entry of the database, and sending the marked information to the probing computing device, wherein the marked information comprises detectable false information that is traceable by the attack correlation system and is uniquely generated for the probing computing device;
after sending the uniquely generated marked information to the probing computing device, receiving from an attack device a communication addressed to a device within the protected network;
analyzing the communication to determine that the communication contains the uniquely generated marked information that is also stored within the entry of the database of the attack correlation system, thereby allowing the attack correlation system to determine that the communication is a potential attack;
responsive to determining that the communication contains the uniquely generated marked information, accessing the database of the attack correlation system to correlate, based on the uniquely generated marked information, the potential attack received from the attack device with the probe communication previously received from the probing computing device based upon the association between the uniquely generated marked information and the probing computing device within the entry of database;
updating the entry of the database to associate the probe communication received from the probing computing device with the communication received from the attack device as coordinated phases of the same network attack against the protected network, wherein the updating of the entry of the database includes storing an identification of the attack device to be associated with both the uniquely generated marked information and with the identification of the probing computing device; and
rerouting the communication to a vulnerable device when the uniquely generated marked information is detected within the communication.

2. The method of claim 1, wherein dynamically generating the marked information comprises generating the marked information to be unique to the probe communication.

3. The method of claim 1, wherein dynamically generating the marked information comprises creating the marked information based on rules.

4. The method of claim 1, wherein dynamically generating the marked information comprises selecting the marked information from an archive containing information previously designated for use as the marked information.

5. The method of claim 1, wherein the database stores the identification of the probing computing device as a network address associated with the probing computing device.

6. The method of claim 1, further comprising correlating patterns of an attacker using the stored information within the database of the attack correlation system that correlates the probe received from the probing computing device with the communication received from the attack device.

7. The method of claim 6, wherein correlating patterns of an attacker comprises correlating reconnaissance activities of the probe with subsequent attacks of the communication.

8. The method of claim 1, wherein rerouting the communication to a vulnerable device comprises rerouting the communication to a dedicated computing device running one or more services that correspond to services offered by devices within the protected network.

9. The method of claim 1, further comprising:
running one or more services that correspond to services offered by devices within the protected network on a virtual infrastructure to create a virtual vulnerable device; and
rerouting the communication to the virtual vulnerable device.

10. The method of claim 9, wherein the virtual vulnerable device comprises a first virtual vulnerable device associated with a first set of marked information and further comprising:
running one or more services that correspond to services offered by devices within the protected network on the virtual infrastructure to create a second virtual vulnerable device associated with a second set of marked information; and
rerouting the communication to the one of the virtual vulnerable devices associated with the marked information detected in the communication.

11. The method of claim 9, further comprising:
terminating the virtual vulnerable device when the virtual vulnerable device is compromised; and
restarting the virtual vulnerable device in an uncompromised state.

12. The method of claim 11, wherein restarting the virtual vulnerable device comprises reloading an image of a boot disk from a protected archive into the virtual vulnerable device.

13. The method of claim 1, further comprising logging the communications between the vulnerable device and the source of the communication containing the marked information.

14. The method of claim 13, further comprising generating a signature of the attack based on the logged communications.

15. The method of claim 14, wherein generating a signature comprises identifying a pattern associated with the timing of the communications.

16. The method of claim 14, wherein generating a signature comprises identifying a pattern associated with information contained within the logged communications.

17. The method of claim 1, further comprising retrieving information associated with attempted attacks from a second attack correlation system.

18. The method of claim 17, wherein retrieving information associated with attempted attacks comprises:
sending a query to the second attack correlation system requesting information regarding attempted attacks monitored by the second attack correlation system; and
receiving a response to the query that includes at least a portion of the information monitored by the second attack correlation system.

19. The method of claim 17, wherein retrieving information associated with attempted attacks comprises:
sending a query to a central node requesting information regarding attempted attacks monitored; and
receiving a response to the query from the central node that includes at least a portion of the attempted attack information gathered by the second attack correlation system.

20. The method of claim 17, wherein retrieving information associated with attempted attacks from a second attack correlation system comprises retrieving identifications of potential attack devices.

21. The method of claim 1, further comprising receiving a periodic report summarizing information gathered by one or more attack correlation systems regarding attempted attacks.

22. The method of claim 1, further comprising responding to the attack by performing one of a reconfiguration of a firewall associated with the protected network and alerting a system administrator.

23. The method of claim 1, further comprising interrogating the vulnerable device after the vulnerable device is compromised to obtain host information associated with the vulnerable device.

24. The method of claim 23, wherein the host information comprises one or more of a registry of the vulnerable device, a list of services or processes running on the vulnerable device, a list of services installed on the vulnerable device, a list of network connections, a list of dynamically linked libraries utilized on the vulnerable device or a configuration file of the vulnerable device.

25. The method of claim 23, wherein interrogating the vulnerable device comprises:
receiving input from a user of a client device that identifies host information to acquire from the vulnerable device;
acquiring the host information from the vulnerable device with a host analysis device coupled to the vulnerable device via a communication link; and
presenting a user interface through which the user views and analyzes the host information acquired from the vulnerable device.

26. The method of claim 23, further comprising generating a signature of the attack based at least in part on the host information.

27. The method of claim 23, further comprising exchanging at least a portion of the host information with another attack correlation system.

28. A computer-implemented system comprising:
a vulnerable device that runs one or more services that correspond to services offered by devices within a protected network; and
an attack correlation system comprising:
a marked information database maintained by the attack correlation system and storing marked information, each entry of the marked information database storing marked information comprising detectable false information that is traceable by the attack correlation system, and each entry associating its marked information with both a probing device and with an attack device;
at least one processor programmed to execute at least one marked information module;
wherein the marked information module receives a probe communication from a probing device,
wherein, in response to receiving the probe communication, the processor accesses the marked information database of the attack correlation system to determine whether the probing device has previously probed the protected network,
wherein, when the probing device has not previously probed the protected network, the processor dynamically generates unique marked information using the marked information module, stores the marked information in an entry of the marked information database to be associated with the probing device and sends the marked information to the probing device;

wherein, after sending the uniquely generated marked information to the probing device, the processor receives from an attack device a communication addressed to a device within the protected network and analyzes the communication to determine that the communication contains the uniquely generated marked information that is also stored within the entry of the marked information database, thereby allowing the attack correlation system to determine whether the communication is a potential attack;

wherein, responsive to determining that the communication contains the uniquely generated marked information, the processor accesses the marked information database of the attack correlation system to correlate the potential attack received from the attack device with the probe communication previously received from the probing device based upon the association between the uniquely generated marked information and the probing device within the entry of the marked information database;

wherein the processor updates the entry of the database to associate the probe communication received from the probing device with the communication received from the attack device as coordinated phases of the same network attack against the protected network, wherein the updating includes storing an identification of the attack device to be associated with both the uniquely generated marked information and with an identification of the probing device in the entry of the database, and wherein the processor reroutes the communication that includes the uniquely generated marked information to the vulnerable device.

29. The system of claim 28, wherein the marked information includes one or more of a user name, a password, a link, an available storage resources, a Uniform Resource Locator (URL) or an Internet Protocol (IP) address/port number combination.

30. The system of claim 28, wherein the marked information module further stores at least one of a destination IP address, a destination port, a timestamp, a packet type, and an identification of the marked information module that generated the marked information.

31. The system of claim 28, wherein the vulnerable device comprises a dedicated computing device.

32. The system of claim 28, wherein the vulnerable device comprises a virtual vulnerable device.

33. The system of claim 32, wherein the virtual vulnerable device comprises a first virtual vulnerable device associated with a first set of marked information, and further comprising a second vulnerable device associated with a second set of marked information that runs one or more services that correspond to services offered by devices within the protected network on the virtual infrastructure, wherein the marked information module reroutes the communication to the one of the virtual vulnerable devices associated with the marked information detected in the communication.

34. The system of claim 32, wherein the virtual vulnerable device comprises a virtual infrastructure on top of which the services are run.

35. The system of claim 32, further comprising a controller that terminates the virtual vulnerable device when the virtual vulnerable device is compromised, and restarts the virtual vulnerable device in an uncompromised state.

36. The system of claim 35, wherein the controller reloads an image of a boot disk from a protected archive into the virtual vulnerable device to restart the virtual vulnerable device in an uncompromised state.

37. The system of claim 28, wherein the vulnerable device logs the communication with the attacker to allow one of a system administrator and a software agent to analyze the logged communication to identify attack methods and weaknesses in the protected network.

38. The system of claim 37, further comprising a software agent that generates a signature of the attack based on the communication.

39. The system of claim 28, further comprising a controller that correlates patterns of an attacker using the marked information.

40. The system of claim 39, wherein the controller correlates reconnaissance activities with subsequent attacks.

41. The system of claim 39, wherein the controller extracts information from the marked information database in response to a query from one of a system administrator, a central node, and another security system.

42. The system of claim 39, wherein the controller issues queries to retrieve information associated with attempted attacks from other attack correlation systems.

43. The system of claim 28, further comprising a response module that responds to the attempted attack.

44. The system of claim 43, wherein the response module responds to the attack by performing one of a reconfiguration of a firewall associated with the protected network and alerting a system administrator.

45. The system of claim 28, further comprising a host analysis device that interrogates the vulnerable device after the vulnerable device is compromised to obtain host information associated with the vulnerable device.

46. The system of claim 28, wherein the host information comprises one or more of a registry of the vulnerable device, a list of services or processes running on the vulnerable device, a list of services installed on the vulnerable device, a list of network connections or a configuration file of the vulnerable device.

47. The system of claim 28, wherein the host analysis device receives input from a user of a client device that identifies host information to acquire from the vulnerable device, acquires the host information from the vulnerable device, and presents a user interface through which the user views and analyzes the host information acquired from the vulnerable device.

48. The system of claim 28, further comprising a controller that generates a signature of the attack based at least in part on the host information.

49. The system of claim 48, wherein the controller exchanges at least a portion of the host information with another attack correlation system.

50. A computer-readable medium comprising instructions that cause a processor to:

receive, by an attack correlation system of a protected network, a probe communication from a probing computing device;

in response to the probe communication, access a database maintained by the attack correlation system to determine whether the probing computing device has previously probed the protected network;

when the probing computing device has not previously probed the protected network, dynamically generate marked information, store the marked information to be associated with an identification of the probing computing device within an entry of the database, and send the marked information to the probing computing device, wherein the marked information comprises detectable false information that is traceable by the attack correlation system and is uniquely generated for the probing computing device;

after sending the uniquely generated marked information to the probing computing device, receive from an attack device a communication addressed to a device within the protected network;

analyze the communication to determine that the communication contains the uniquely generated marked information that is also stored within the entry of the database of the attack correlation system, thereby allowing the attack correlation system to determine that the communication is a potential attack;

responsive to determining that the communication contains the uniquely generated marked information, access the database of the attack correlation system to correlate, based on the uniquely generated marked information, the potential attack received from the attack device with the probe communication previously received from the probing computing device based upon the association between the uniquely generated marked information and the probing computing device within the entry of database;

update the entry of the database to associate the probe communication received from the probing computing device with the communication received from the attack device as coordinated phases of the same network attack against the protected network, wherein the updating of the entry of the database includes storing an identification of the attack device to be associated with both the uniquely generated marked information and with the identification of the probing computing device; and reroute the communication to a vulnerable device when the uniquely generated marked information is detected within the communication.

* * * * *

UNITED STATES PATENT AND TRADEMARK OFFICE
CERTIFICATE OF CORRECTION

| | | |
|---|---|---|
| PATENT NO. | : 7,748,040 B2 | Page 1 of 1 |
| APPLICATION NO. | : 11/087388 | |
| DATED | : June 29, 2010 | |
| INVENTOR(S) | : Frank N. Adelstein | |

It is certified that error appears in the above-identified patent and that said Letters Patent is hereby corrected as shown below:

Column 2, line 49, "attackers" should read -- attackers' --

Column 3, line 43, "a attack" should read -- an attack --

Column 4, line 12, "attack a correlation system" should read -- an attack correlation system --

Column 5, line 58, "each stages" should read -- each stage --

Column 25, line 40 (Claim 29), "resources" should read -- resource --

Signed and Sealed this
Eleventh Day of October, 2011

David J. Kappos
*Director of the United States Patent and Trademark Office*